US007002968B1

(12) United States Patent
Tomizawa et al.

(10) Patent No.: US 7,002,968 B1
(45) Date of Patent: Feb. 21, 2006

(54) TRANSPORT SYSTEM AND TRANSPORT METHOD

(75) Inventors: Masahito Tomizawa, Yokosuka (JP); Yoshiaki Kisaka, Yokohama (JP); Yutaka Miyamoto, Yokohama (JP); Takashi Ono, Yokohama (JP); Hiromu Toba, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 840 days.

(21) Appl. No.: 09/664,001

(22) Filed: Sep. 18, 2000

(30) Foreign Application Priority Data

Sep. 17, 1999 (JP) ............................. P 11-263459
Oct. 4, 1999 (JP) ............................. P 11-283029

(51) Int. Cl.
*H04L 12/28* (2006.01)

(52) U.S. Cl. .................. 370/395.52; 370/442; 370/503

(58) Field of Classification Search ................ 370/351, 370/352, 353, 389, 395.1, 395.21, 395.51, 370/401, 402, 403, 404, 405, 474, 476, 907, 370/395.5–395.65, 503–514, 535–545
See application file for complete search history.

(56) References Cited

U.S. PATENT DOCUMENTS

| 4,525,837 | A | | 6/1985 | Tan et al. |
| 4,764,921 | A | | 8/1988 | Graves et al. |
| 6,151,336 | A | * | 11/2000 | Cheng et al. ............... 370/535 |
| 6,226,296 | B1 | * | 5/2001 | Lindsey et al. ............. 370/401 |
| 6,778,561 | B1 | * | 8/2004 | Jha ............................ 370/537 |

FOREIGN PATENT DOCUMENTS

| EP | 0 684 712 | * | 11/1995 |
| JP | 10-200495 | | 7/1998 |
| JP | 2000-041024 | | 2/2000 |
| WO | 99/41863 A1 | | 8/1999 |

OTHER PUBLICATIONS

Doshi et al, IP over SONET, IEEE, pp. 136-142, May 1998.*
Kobayashi et al, SDH-based 10 Gbit/s Optical Transmission System, IEEE, pp. 1166-1170, 1991.*
Turner, Terabit Burst Switching, Washington University, pp. 1-36, 1997.*
Project P918-GI, Integration of IP over Optical Networks: Networking and Managment, Deliverable 1, pp. 1-39, 1999.*
Yamabayashi et al, Autonomously Controlled Multiprotocol Wavelength Switching Network for Internet Backbones, IEICE, pp. 2210-2215, 2000.*
Chandhok et al, IP over Optical Networks: A Summary of Issues, Internet Draft, pp. 1-52, 2000.*
Cisco Systems, Cisco 12000 Series Gigabit Switch Routers, pp. 1-8,1999.*
Gambini et al, Transparent Optical Packet Switching: Network Architecture and Demonstrators in the KEOPS Project, IEEE, pp. 1245-1259, 1998.*
Yasuhiko Tada, et al. *"OA&M Framework for Multiwavelength Photonic Trasport Networks"* IEE Journal on Selected Areas in Communications. vol. 14. No. 5, Jun. 1996, pp. 914-922, 1996 IEEE.

(Continued)

*Primary Examiner*—Frank Duong
(74) *Attorney, Agent, or Firm*—Thelen Reid & Priest LLP

(57) ABSTRACT

A signal transport system and a transport method are provided. A whole lowspeed signal containing a client overhead received from a client network is transparently subjected to time division multiplexing and an additional overhead is inserted in the whole signal and further subjected to wavelength division multiplexing, so that the digital signal having the addition overhead is transported in the wavelength division mode represented by one wavelength to a receiving equipment.

30 Claims, 17 Drawing Sheets

OTHER PUBLICATIONS

Masaharu Ohashi "*ITU-T SG15 Q15, 16-17 Experts' meetings in NARA, Japan*," Aug. 31, 1999.
"ITU-T SG15 Q15, Q16, and Q17 Experts' Meeting in NARA, Japan Contribution Index " Update: 1999310.5.
Abstract"*Applications of 40 Gbit/s Transmission system and Proposed Description in G. 691*," Source: NTT.
"Globecom'97 IEEE Global Telecommunications Conference" Conference Record vol. 1- of 3, Nov. 3-8, 1997.
Satoru Okamoto, et al, "Inter-Network Interfacefor Photonic Transport Networks and SDH Transport Networks," NTT Optical Network Systems Laboratories 1-1 Hikari-no-oka, yokosuka-shi, Kanagawa, 239, Japan. pp. 850-855, 1997 IEEE.
Abstract: "Aproposal for a Rate-Preserving OCH Overhead Approach" study period 1997-2000. Hitachi Telecom (USA), Inc.
Abstract: "A Proposed Implementation for A Digital "Wrapper" for Och Overhead," Luc.ent Teechnologies.
Geneva, SG 15, Jun. 21-Jul. 2, 1999, "Why Maintaining The OTN Should Not Depend On A Particular Client".
Copy of European Search Report dated Nov. 24, 2004.

* cited by examiner

TRANSPORT SYSTEM AND TRANSPORT METHOD

BACKGROUND OF THE INVENTION

Field of the Invention

The present invention relates to transport of signals in a wavelength division multiplexing network, and relates in particular to a technology for transporting client signals transparently and economically while maintaining a high quality of signals.

This application is based on patent application numbers Hei 11-263459 and Hei 11-283029 filed in Japan, the contents of which are incorporated herein by reference.

DESCRIPTION OF THE RELATED ART

SDH (synchronous digital hierarchy) is an internationally accepted standard for multiplexing existing service signals in optical transport systems. SDH operates on a base speed of 156 Mbit/s in STM-1 format (synchronous transfer module, level 1), and the current advisory is given for speeds up to 10 Gbit/s in STM-64 frame format (refer to FIG. 1 right lower format for SDH frame formats).

Also, in the United States, SONET (synchronous optical network), which is similar to SDH, is being used as the defacto standard, and therefore, mainstream architectures in optical transport are international standard SDH and US defacto standard SONET. This situation has resulted in large quantities of optical transport systems based on SONET or SDH protocols being introduced into the marketplace. The SONET/SDH market place is therefore reaching a stage of maturity, and the cost of SONET/SDH compatible interface cards are dropping drastically.

Also, the WDM (wavelength division multiplexing) technology for assigning a wavelength to a channel is showing rapid progress such that further improvement in increasing the bandwidth of WDM signals per one fiber is being demanded.

In the meantime, computer industry has shown remarkable progress, particularly in router technologies, and routers in the 10 Gbit/s throughput class are now available in the marketplace. Such routers are provided with a high-speed interface of over Gbit/s speed, and utilize physical layer technology such as SONET/SDH and fiber-channel.

In the conventional transport system, packets for computer communication are mapped according to SONET/SDH or fiber channel format, and are further bundled by WDM technique. A conventional optical transport system is shown in FIG. 1.

FIG. 1 shows a system configuration for WDM transport of SDH frames in a NW (network). Packets being transported in IP (Internet protocol)-NW are mapped using PPP (point-to-point protocol) or other protocols in a router having an SDH interface by correlating the packets with the container in the SDH-NW frame format, containing the payload in SDH frames, and indicating the frame phase by inserting a pointer in SOH (section overhead) to indicate the leading position of POH (Path Overhead). SDH frames are directly multiplexed in WDM regime.

In the SDH format shown in FIG. 1, N refers to a degree of multiplexing carried out in the STM on a base of 156 Mbit/s, so that N=1 for 156 Mbit/s, N=4 for 622 Mbit/s, N=16 for 2.4 Gbit/s and N=64 for 10 Gbit/s.

If it is desired to further increase the degree of multiplexing in the optical transport system, frequency utilization efficiency becomes an issue. WDM is based on fixed and descrete bandwidth occupation on the frequency axis, and a 100 GHz grid is chosen according to the ITU standard for example. In contrast, TDM (time division multiplexing) is based on allocating a channel to a time slot, bandwidth occupation is continuous around each carrier frequency.

Although dependent on the precision of wavelength filters, it is generally useful to perform TDM first before carrying out WDM in raising the frequency utilization efficiency.

Although network transmission in the WDM mode (WDM-NW) is possible, it is impractical even in the future to expect end-to-end to all optical transport because of S/N degradation, group velocity dispersion, and non-linear optical effects. Therefore, 3R-function, that is regeneration equalizing amplification and clock extracting, in every WDM-NW becomes essential. In doing so, there is an additional benefit that TDMs at the entry points to WDM-NW will have the effect of reducing the number of type 3R circuits required.

However, the use of SDH multiplexer for TDM in WDM-NW transport will cause several problems.

First, SOH, originally for use by network carriers to manage the network operation is becoming useful in managing user networks. In other words, there have been increasing demands by clients to use the SOH portion of the SDH frame for their own use. However, in the existing SONNET/SDH multiplexers, SOH is terminated or rewritten at each section so that as soon as SOH enters a facility operated by the carrier, the information needed by the user is lost.

Another problem is that SDH for optical interfaces provided in routers are often imperfect, meaning that, for example, pointers used to adjust the clock frequency is omitted in many cases. In such a situation, even though pointer processing may be carried out by SDH multiplexer, such is not the case on the router side of the network system, and therefore, bit slips are frequently caused by differences in the clock frequencies. The precision of the existing routers is 100 ppm, which is an order of magnitude inferior to 20 ppm for SDH.

It is further unpredictable whether the routers in the future will continue to depend on interfaces customized to SDH or fiber channel, so that one might expect that routers having a new frame may be developed and demand connection to carrier network.

Demands for restoration of failure in transport path also vary depending on clients. Some clients in WDM network have failure restoration functions. For example, the SDH architecture specifies a protection switching function, so that it is not mandatory for the WDM network to provide path restoration services.

However, low-cost SDH devices not having protection switching function are sold in the marketplace, and it is quite understandable that there could be demands for the WDM network to provide restoration services. As the nature of clients diversifies along with the expansion in network capacity, it has become necessary for the WDM network to accommodate a variety of demands for service quality in a flexible manner.

Hereafter, current feature of clock synchronizing function will be explained in detail.

To transport digital signals to destinations economically, a multiple lowspeed digital signals are subjected to TDM, and the TDM signals are transported as one high-speed digital signals stream. To perform TDM of lowspeed digital signals, it is necessary that the frequencies of each lowspeed digital signal is accurately matched. To synchronize the frequencies of lowspeed digital signals, stuff synchronization method or network synchronization method are used.

First, stuff synchronization method will be explained with reference to FIG. 7. In this method, individual lowspeed digital signals are temporarily memorized, and they are read at a frequency f0 which is slightly higher than all the lowspeed digital signals, and excess pulses (stuffing pulses) that corresponds to each frequency f0–f1, f0–fj, . . . , and not having any information are added and synchronized to each frequency f0 of the lowspeed digital signals. Synchronized lowspeed digital signals are subjected to TDM, and are sent as one stream of high-speed digital signals. Information regarding stuffing pulses is sent separately so that the receiving equipment can remove the stuffing pulses to restore the original signals. Removal of excess pulses is referred to as destuffing.

FIG. 8 shows a block diagram of the construction of a stuff synchronized multi/demultiplexing apparatus. Clock components are extracted from the lowspeed digital signals by extracting the clock signals from the clock extraction section 411 to generate a write-clock for the buffer memory 412. Lowspeed digital signals are entered in the buffer memory 412 according to the write-clock. A timing generation section 413 and a stuff control section 414 generate the read-clock for reading data from the buffer memory 412. Data are read according to the read-clock in the written sequence. A digital multiplexer 415 multiplexes read signals and stuffing pulses to generate synchronized signals, and a plurality of such synchronized signals are subjected to TDM to produce a stream of high-speed digital signals.

A phase comparator 416 compares the phases of the write-clock and the read-clock for the buffer memory 412, and outputs voltage signals proportional to phase differences. When the read-clock frequency is higher than the write-clock frequency, phase differences increase and the magnitude of the output voltage increases. If the phase difference exceeds a threshold value, that is, when the value of the output voltage from the phase comparator 416 exceeds a certain value, a positive stuffing is performed to delay the read-clock by 1-bit at a location in a frame specified by a stuff enabling timing, thereby synchronizing the frequencies.

FIG. 9 shows a block diagram of the construction of the stuff synchronized multi/demultiplexing apparatus. In the demultiplexer 421, high-speed signal is demultiplexed into a plurality of synchronized signals. The clock extraction section 422 extracts clock components from the synchronized signals, and a write-clock for the buffer memory 423 is generated. When stuffing pulses are present in the transport frames, destuff control section 424 delays the write-clock by 1-bit at the stuff pulse insertion location. In the stuff pulse insertion location, the write-clock is deleted, meaning destuffed. The clock having a gap due to destuffing is leveled by the phase lock loop 425, and the read-clock having the same frequency as the original lowspeed digital signals is regenerated. Data are read in the write-sequence from the buffer memory 423 according to the read-clock to regenerate the original lowspeed digital signals. The phase locked loop 425 includes a phase comparator 426, a lowpass filter 427 and a voltage control oscillator 428. The introduction of stuff synchronization enables TDM of digital signals, and economical digital signal transport superior to analogue signal transport has been realized. This scheme is used in PDH (Plesiocronous Digital Hierarchy) network.

On the other hand, network synchronization aims to improve network operating efficiency and flexibility by simplifying the processing functions of each device operating within the network by supplying a common clock to the digital multiplexer, switching devices, terminal devices and the like. Multiplexing methods that are capable of synchronizing signals at speeds up to Gbit/s include SDH as a standard architecture. FIGS. 10, 11 show STM frames of the SDH architecture. An STM frame is comprised by a section overhead 431 defined for network maintenance, a payload 432 storing user information, and a pointer 433 to show the leading location 435 of the user information 434 in the payload.

The SDH architecture presupposes network synchronization, but it is necessary to transport signals through several network carrier networks, and in order to ensure the quality of transmission, even when such carrier networks are operating under independent clocks, stuff synchronization by the pointer is adopted.

Positive and negative stuff processing using the pointer will be explained with reference to FIGS. 12, 13. FIGS. 12, 13 show the same STM frame of SDH architecture as that shown in FIG. 11. As shown in FIG. 12, when the frequency of the lowspeed digital signals to be multiplexed is slightly lower than the frequency of the payload in the STM frame, positive stuffing is performed to insert stuffing bytes 442 directly behind the pointer byte of the pointer 441. Conversely, as shown in FIG. 13, when the frequency of the lowspeed digital signals to be multiplexed is slightly higher than the frequency of the payload in the STM frame, negative stuffing is performed to store user information 452 in the last byte of the pointer 451. When the frequency of the lowspeed digital signals to be multiplexed is the same as the frequency of the payload in the STM frame, stuffing is not performed. Accordingly, positive and negative stuffing assure frequency synchronization to be realized, and even in the case of synchronous digital transport, it is possible to subject the non-synchronized digital signals to TDM to transport stable high quality TDM signals.

Because the SDH architecture can perform synchronization at all transport speeds up to Gigabit/s speeds to provide network economy and flexibility, many network carriers are adopting this approach. However, the SDH marketplace is maturing, and SDH interface cards are becoming much lower priced so that users themselves are beginning to use SDH interface cards. For this reason, OH transparency is demanded of the carrier networks so that the entire frame including the OH, which had been used for network maintenance management, now represents a user signal, such that the SDH functions are not available to network carriers for use. It follows that the network carriers are no longer able to use the pointer function that has been utilized for synchronization purpose.

Also, because of the availability of high-speed routers, carrier networks themselves can accommodate routers directly within the individual carrier networks. That is, possibility is emerging that self-contained routers having internal clock oscillator should be multiplexed with synchronized digital signals. When non-synchronized digital signals are multiplexed without using the pointer, differences in the frequencies of the transport frames and non-synchronized multiplexed digital signals can occur, and when the difference exceeds the capacity of buffer memory device, problems such as read-data duplication and data skip can occur so that reliable high quality transport cannot be maintained.

It might be possible that, OH transparency can be provided if the network carriers use the method of frequency synchronization based only on the pointer without changing the OH in the SDH network. However, there are many routers not having the pointer function in the marketplace now, so that routers equipped with such SDH interface cards not having the pointer function cannot be accommodated in the network.

SUMMARY OF THE INVENTION

It is an object of the present invention, therefore, to provide an economical signal transport system and a signal processing apparatus for ultra-high-speed network, so as to enable network carriers to respond to a variety of client needs, by simplifying the signal processing procedures in multiplexing sections while maintaining high signal quality.

The object has been achieved in the present invention by a transport system for transporting wavelength division multiplexed signals through a network by applying time division multiplexing transparently to a whole signal of a client (including client OH for example SOH) and attaching an additional overhead to the whole signal of the client, and transporting a time-division-multiplexed signal having FEC bits, frame synchronization bits, channel identifier bits, CLK adjuster bits and protection bits defined in the additional overhead. Such a transport system enables to produce transparency in overhead associated with the client signals while maintaining a high quality of transported signals.

It is a second object of the present invention to provide a transport system and an apparatus to produce transparency in the overhead associated with the carrier network while providing high quality service in transporting synchronized and non-synchronized user signals in the time division multiplexing mode.

The second object has been achieved in a method for multiplexing synchronized and non-synchronized signals, comprising the steps of: adding an additional overhead to a digital signal, applying positive or negative stuffing according to overhead information, synchronizing a client frequency to a network frequency, and applying time division multiplexing for transport of a multiplexed signal to be demultiplexed by a receiving equipment to regenerate an original digital signal.

Also, the above object has been achieved in an example of the synchronized multiplexing transport system comprised by a multiplexer provided with: a clock supply section for supplying network synchronizing clock signals; a receiving section for optical-electrical conversion of a lowspeed optical signal to regenerate a lowspeed digital signal; a frequency synchronizing section for attaching an additional overhead to the lowspeed digital signal, applying positive or negative stuffing with reference to the additional overhead, and synchronizing an original frequency of the lowspeed digital signal to a frequency of said own network; a digital multiplexing section for time division multiplexing a plurality of synchronized lowspeed digital signals; a common control section for controlling the frequency synchronizing section and the digital multiplexing section; and a sending section for converting time division multiplexed signal to a high-speed optical signal and forwarding to a transmission line; and also a demultiplexer provided with: a multi/demultiplexing section for optical-electrical conversion of a high-speed optical signal to regenerate the high-speed digital signal; a frequency restoring section for restoring the synchronized lowspeed signal to said original frequency of the lowspeed signal by applying positive or negative stuffing with reference to the additional overhead attached to the lowspeed digital signal; a common controller for controlling the multi/demultiplexing section and the frequency restoring section; and a sending section for converting the restored lowspeed digital signal to an optical signal and forwarding to a lowspeed transport apparatus.

Also, the above object is achieved in a method for multiplexing synchronized and non-synchronized signals, comprising the steps of: attaching an additional overhead to a digital signal; applying positive stuffing according to overhead information to synchronize frequencies, applying time division multiplexing for transport of a digital signal stream to be demultiplexed by a receiving equipment to regenerate an original digital signal.

Accordingly, an additional overhead is attached to a user SDH signal, for example, so that the frequencies are synchronized by applying stuffing based on information contained the additional overhead, and lowspeed digital signals are synchronized using the frequency synchronizing function to apply time division multiplexing without using the overhead associated with the client signal.

Furthermore, the additional overhead is used for protection switching the transmission signal to restore a failed line within an network to maintain high quality of transport service. Also, by providing an additional overhead for each client, a variety of demands can be processed in a flexible manner.

DESCRIPTION OF THE PREFERRED EMBODIMENTS

Figure 1:
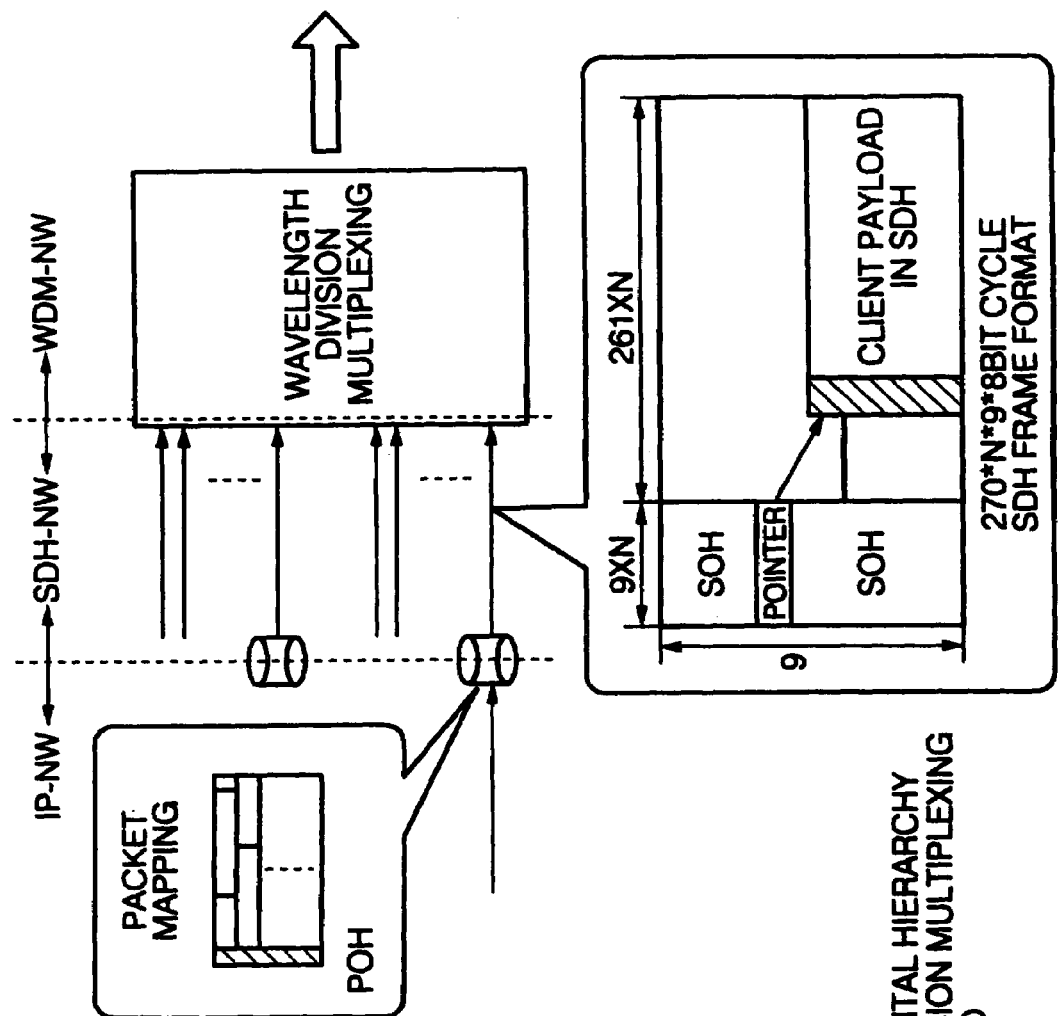
FIG. 1 is a schematic diagram of a signal format in the conventional transport system.

The following embodiments are provided for illustrative purposes and do not limit the interpretation of the claims, and the combination of all the features explained in the embodiments may not always be necessary for solving the problems that may arise in similar situations.

The present invention will be explained in the following with reference to the drawings.

In all diagrams used to explain the invention, those parts having the same function are referenced by the same reference numerals, and their explanations are omitted.

Embodiment 1

Figure 2:
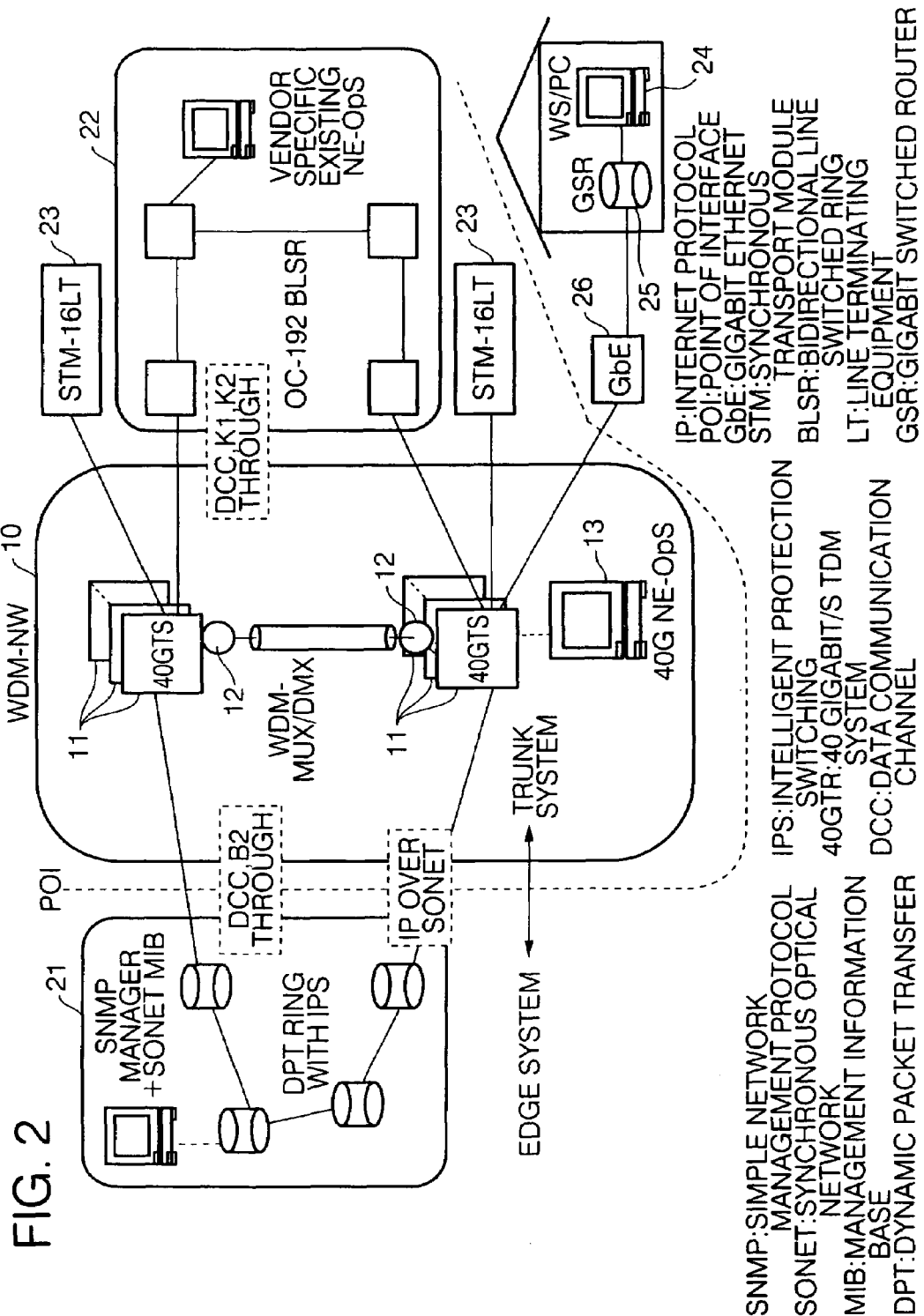
FIG. 2 is a schematic diagram of a network configuration in Embodiment 1 of the present transport system.

FIG. 2 shows Embodiment 1 of the present transport system, and it is an example of an application of the transport system to the of WDM-NW (wavelength division multiplexed network) in the point-to-point transfer arrangement.

The WDM-NW 10 in FIG. 2 is comprised by a TDM transport apparatus (40 Gbit/s TDM system 40 GTS) 11 disposed at the boundary section (entry/exit) to interface with other networks; a WDM-MUX/DMX (wavelength division multi/demultiplexer) 12; and an operation system (40G NE-OpS) 13, to manage the entire WDM-NW. Here, as many 40GTS 11 are installed as there are channels to be multiplexed, which is represented by n in this example, at every boundary section.

In this case, the line rate per channel is 40 Gbit/s. And, client signals connected to tributaries are operated from 1 Gbit/s or 10 Gbit/s, and the signal format is IP-SONET/SDH as well as conventional SONET/SDH, IP-Gigabit Ethernet (with fiber-channel physical boundary) and other newer formats. In other words, the system is format-independent, and is operable so long as the bit rate is specified.

FIG. 2 shows various applications of tributaries connected to 40GTS: such as an application to transport within one district of DPT (dynamic packet transfer) ring 21 using one channel in 40 Gbit/s as an example of IP/SONET (refer to port technology and applications overview, an application to transport within one district of BLSR (bi-directional line switched ring) 22 using OC-192 similarly using one channel in 40 Gbit/s as an example of conventional SONET; and STM-16 LT (line terminating equipment) as an example of the conventional SDH.

It also shows client terminals (work station WS) 24 connected by way of GSR (gigabit switched router) 25 through GbE (Gigabit Ethernet) 26.

There are six features of the present invention, described in the following, that can accommodate clients data so long as the bit rate is specified:

(1) overhead (OH) of the client is not used, and the signals are subjected to TDM without termination;
(2) additional OH is defined and used for monitoring WDM end-to-end transfer, and the bit rate is increased by the amount of additional OH;
(3) provide bit/byte for purposes of frame synchronization or channel identifier in the additional OH, thereby separating the signals to desired channels;
(4) provide bit/byte for FEC (forward error correction) purposes in the additional OH to improve transport signal quality, and use FEC-PM (which is an error correction bit counter), included in FEC, to monitor optical channels in WDM; and
(5) provide bit/byte for clock adjustment of lowspeed input signal in the additional OH so as to provide TDM of client signals of different frequencies without slips.
(6) provide bit/byte for porotection purposes, as to restore signals when failure occur in WDM-NW.

Figure 3:
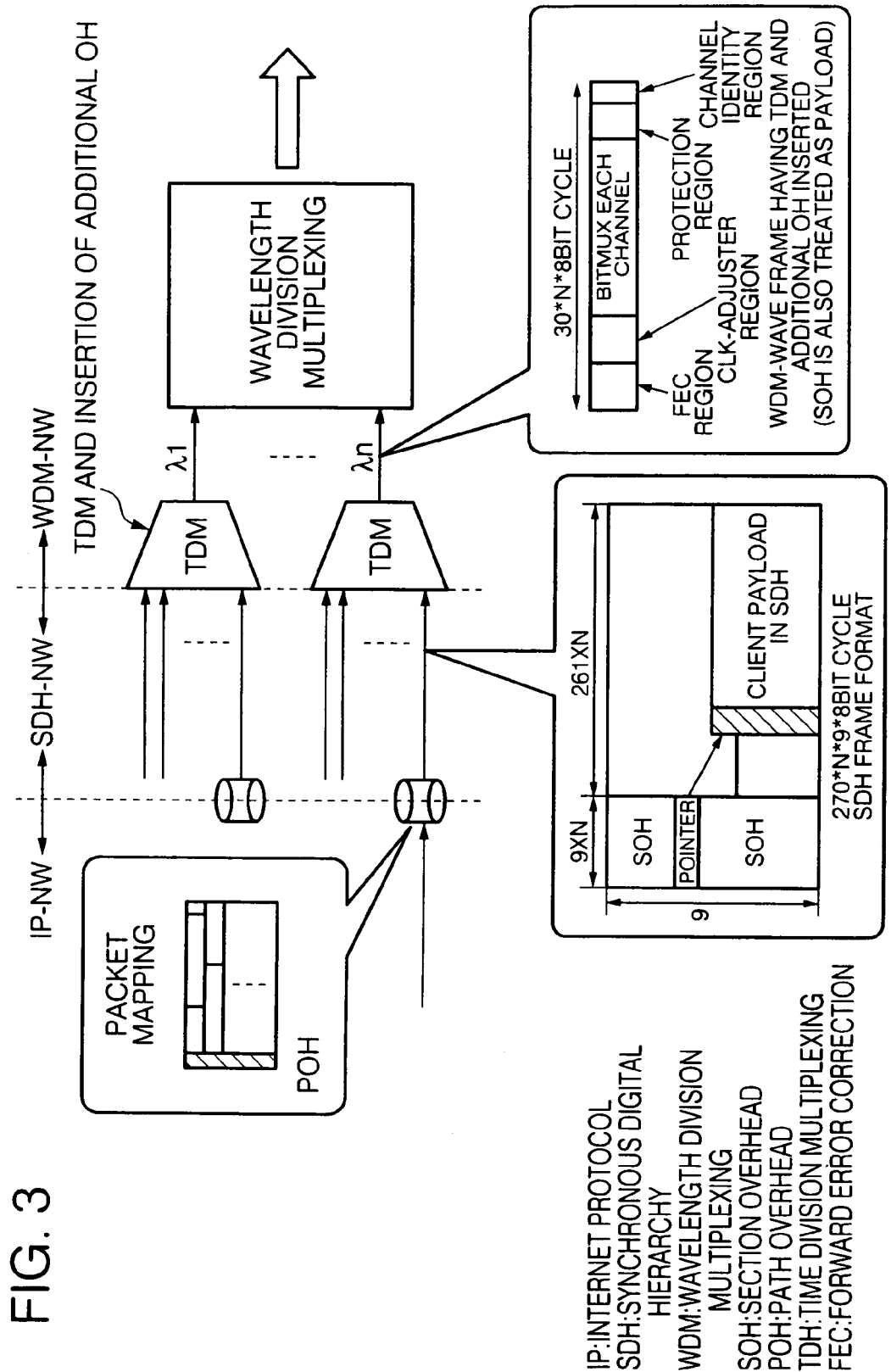
FIG. 3 is a schematic diagram of an example of the signal format in the present transport system.

FIG. 3 shows an example of the signal format of the present transport system related to the five features presented above. Unlike the conventional transport system shown in FIG. 1, in the present system shown in FIG. 3, a TDM function and an additional OH insertion and termination function are provided at the entry/exit points of the WDM-NW. By so doing, the SOH used by the client side SDH network can be put through while ensuring monitoring means for the carrier side WDM-NW.

With respect to point (1), the present system does not provide frame synchronization of client input, in other words, only 3R functions are provided. In conventional SDH apparatus and even in conventional stuff multiplexers, frame phases of lowspeed input signals and frame phases of multiplexer have been controlled. In the case of SDH, the pointer was used to command frame phase shift, and in stuff multiplexer, phases of all the input signals are aligned. In the present system, frame phase of lowspeed input signals is not detected, and multiplexing is performed by bit synchronization only, i.e., by aligning the clock phases only.

In FIG. 3, client side SDH frame is transported at 270*N*9*8 bit and 0.125 ms cycle, but in the WDM side, SDH frames are ignored and a suitable leading position is used to bitMUX (bit multiplexing), and an additional OH, containing a FEC region, a CLK adjust region, a channel identity region, and protection region are inserted.

In the present embodiment, TDM multiplexing is performed by bit interleave. Bit interleave multiplexing method is more advantageous than byteMUX, cellMUX or packet-MUX from the standpoint of circuit scale. Also, byte interleave multiplexing can also be used, and in such a case, although circuit scale becomes larger, it has an advantage that byteMUX can be matched to client SDH-multiplexing. Specifically, contiguous stringing of same level of signal can be avoided at high probability because of the use of client SDH scrambler.

There is one problem associated with ignoring the lowspeed frames. This is a fact that degradation of signal quality in lowspeed signals cannot be detected. In the present invention, a substitute technique is used in a form of analogue monitoring (refer to I. Shake, H. Takara, S. Kawanishi, and Y. Yamabashi, "Optical signal quality monitoring method based on optical sampling", ElectronLett., vol. 34, no. 22, 1988) based on power monitor and optical Q monitor. This method is lower in precision compared with perfect digital monitoring, but it has advantages that the cost is lower and meets the demand for client-dependent control.

With respect to (2), bit/byte requirement is defined according to the object of the network monitor. In the present embodiment, control commands are generated and transferred from the 40 G NE-Ops to the monitoring apparatus via DCC (data communication channel), or alarms are uploaded from the monitoring apparatus to 40 G NE-Ops. It is acceptable to use bit/byte for parity check for performance monitoring or bit/byte for RDI (remote defect indication) warning output from external multiplexing devices.

With respect to (3), this is a delimiter intended to provide separation of desired signals to desired channels, and is defined in the additional OH. The applicable methods include insertion of frame synchronization byte, A1=F6 and A2=28 used also for SDH, in the additional OH, or other pattern recognition methods can be used. Use of the A1, A2 method has advantages that similar circuit designs to circuits in SDH may be utilized so that the cost of the apparatus can be lowered and the technology itself is well understood.

Also, by shortening the period for inserting frame sync pattern than the corresponding period for SDH frames (for example, one line portion of STM-16), it is possible to achieve a higher pull-in sync speed compared with the SDH structure. The period for the new frames is 30*N*8 bit in the example shown in FIG. 3, which is about ⅛ of the speed of SDH frames so that pull-in can be performed eight times faster.

With respect to (4), check bit for FEC is included in the additional OH region. FEC is an effective digital technique for improving the transport quality of signals, and is used mainly for undersea applications.

Here, FEC codes may include ITU-G for undersea use, Reed Solomon codes (255, 239) (refer to ITU-T Recommendation G. 975, forward error correcting for submarine systems, 1996), or single error correction SEC, for example, Hamming codes, or BCH-n where n>1 in Bose-Chandhuri-Hocquenghem codes. FEC codes are used to detect errors, specify error bits and correct errors, and the error detection function is used in the section monitoring device within a WDM district.

Also, error correction is performed by sending error correction pulses to invert the bits through EX-OR gate, so that errors can be monitored by counting the error correction pulses. The result is that a prevention function is realized that, although errors are not received by the clients, it is possible to know how many errors are being generated in the actual transport paths. The function for reporting both error detection and correction bit count to the 40G NE-OpS is termed FEC-PM (FEC performance-monitoring). Therefore, by monitoring the WDM district using the FEC-PM, the parity bits defined separately in SDH structure become redundant (although they may still be included), and it is also possible to provide preventative maintenance checking without attracting attention of clients.

With respect to (5), the present method offers a solution to the problem of connecting to routers such as IP/SONET and Gigabit-Ethernet. As mentioned earlier, the precision of router frequency is about ¹⁄₁₀ of the conventional SDH apparatus. When lowspeed signals of such a clock frequency precision are input into a network, a problem particular to TDM method is generated. That is, all lowspeed signals, unless they are an integer fraction of the multiplexer clock, bit slip is generated without exception.

This type of problem has always been a plague in the old stuff synchronization approach, and in the old approach, this problem has be resolved by reading the lowspeed signals at a higher clock speed, and inserting excess pulses. As well, although network is synchronized so that the entire SDH network is supposed to be synchronized, stuff function is provided in the pointer process to realize positive/negative stuffing function so as to negate frequency differences. Particularly, in SDH structure, network-based synchronization is the basis of operation such that the pointer is provided with definitions for writing payload information in H3 byte of the pointer during negative stuffing, or with definitions for command bytes for generating either positive/negative stuff.

In the present invention, network synchronization is the basis of operation, and the stuffing function is used only for connecting to routers of low frequency precision or mismatched frequencies.

Figure 4:
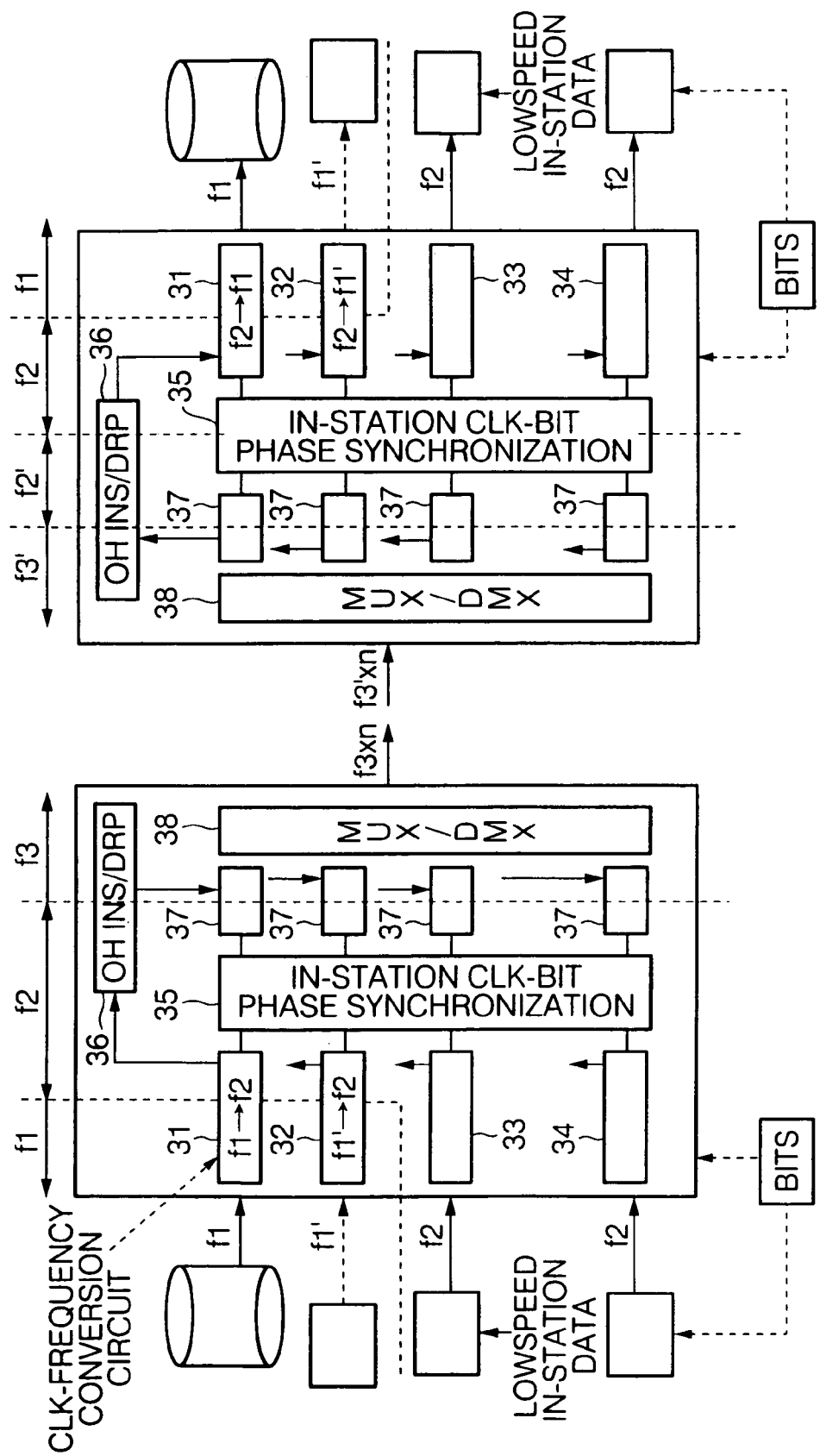
FIG. 4 is a block diagram of the clock frequency adjusting section in the present transport system.

FIG. 4 shows an example of the structure of clock (CLK) frequency adjusting section, where in-station clock means building integrated timing. In FIG. 4, reference numerals 31, 32, 33, 34 refer to a CLK-frequency conversion circuit; 35 to an in-station CLK-bit phase synchronizing circuit; 36 to an OH insert/drop circuit (OH INS/DRP); 37 to a write/read circuit; 38 to a time division multi/demultiplexing circuit (TDM-MUX/DMX).

Here, the CLK-frequency for network synchronization is denoted by f2 which is assumed to be synchronized to the in-station CLK supply device BITS (building integrated timing supply). CLK-frequencies from routers or other devices are designated by f1, f1'. It is assumed also that f2<f1'. And, because of the insertion of the additional OH, the frequency is raised before multiplexing, and the raised frequency is denoted by f3, therefore, multiplexed frequency is denoted by f3×n. Unlike the SDH architecture in which pointer is used to insert/drop pulses in the ultimate stage of SDH-nonSDH conversion, in the present system, stuffing is performed at the entry point to the multiplexer so that it is mandatory to revert to the original frequency by inserting/dropping pulses at the exit point of the multiplexer. Therefore, destuff jitters (in another word, waiting time jitter) are accumulated for each multiplexer.

In the present invention, it is necessary to avoid the problem of affecting the network synchronized signals by connecting the present system to a few routers having different frequencies. Unlike the old stuffing process, positive stuffing is not always generated in the present system so that network synchronized signals are not subjected to stuffing. In FIG. 4, CLK-frequency conversion circuits 31, 32 are activated and stuffing is not generated in other sections. Therefore, CLK-frequency conversion circuit may be omitted from the network synchronized input sections, which do not require stuffing. In the present invention, both positive and negative stuffing functions are necessary, so that it is necessary to provide, in the additional OH, messages for reporting generation and type of stuffing, bit/byte for containing payload signals when negative stuffing is to be applied.

In FIG. 4, input data f1 from the router is switched to f2 by the CLK-frequency conversion circuit. In doing so, because information bits are lacking, excess bits are inserted. As for input f1', it is changed to f2, but information overflows so that overflow information is included in the additional OH for transport. If bit interleaving is used in this embodiment, stuffing can also be carried out in 1-bit unit.

Embodiment 2

Figure 5:
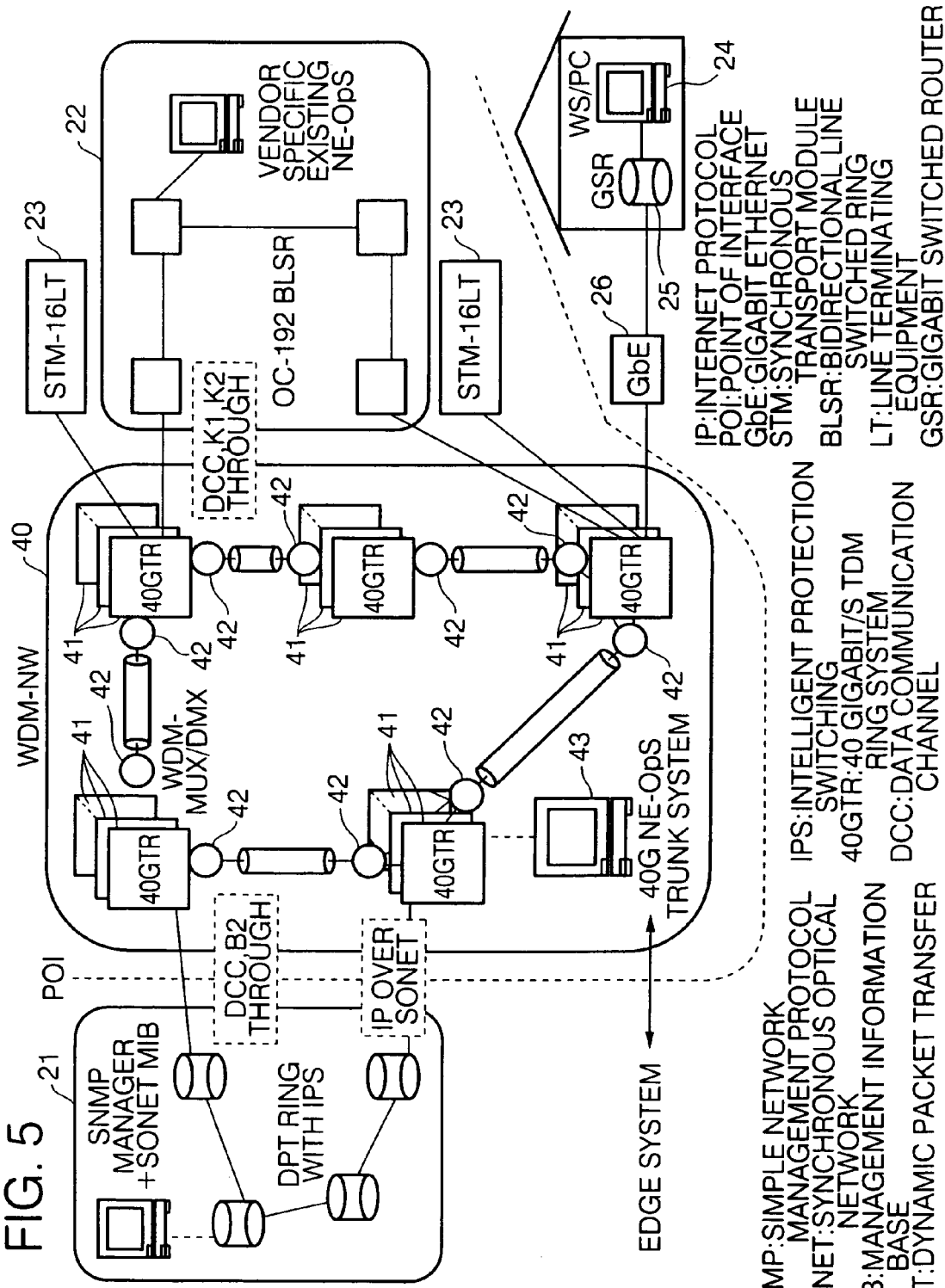
FIG. 5 is a schematic diagram of a network configuration in Embodiment 2 of the present transport system.

FIG. 5 shows a transport system in Embodiment 2, and in this case, the system is applied to a ring-structured WDM-NW (wavelength division multiplexed network).

In FIG. 5, a reference numeral 40 refers to a WDM-NW, and is comprised by a TDM transport apparatus 41 disposed at the boundary section (entry/exit points) to interface with other networks having a 40 Gbit/s TDM ring system 40 GTR; a WDM-MUX/DMX (wavelength division multi/demultiplexer) 42; an operation system (40G Ne-OpS) 43 for managing the entire WDM-NW. Here, as many 40 GTR 41 are installed as there are channels to be multiplexed, n in this example, at every boundary section.

As in Embodiment 1, DPT ring 21, OC-192BLSR22, STM-16LT23, GbE26 and others are included.

To construct a ring with 40 Gbit/s per wavelength channel, the 40GTR41 has a cross connect (XC), for path-grooming purposes, added to the 40GTS used in Embodiment 1. In this embodiment, an XC of a simple structure is used.

Current XC in SONET ADM network can handle a large bundle of transport paths up to 10 Gbit/s in units of 50 Mbit/s. That is, 192 paths can be handled at 10 Gbit/s, and when switching in BLSR, XC is used for loopback path for repair operation, so that the capacity of XC in 10 Gbit/s transmission needs to be 40 G×40 G. Also, XC normally uses time switch (T-SW), and ports are switched basically by controlling the read/write addresses in the memory device. Therefore, it is necessary to develop the capacity of XC in parallel to the operational speeds of memory devices (<100 MHz).

In this embodiment, construction of XC is simplified by limiting the capacity for handling data to 2.4 Gbit/s or 10 Gbit/s, and using the SW on the selector base.

Normally, XC uses non-blocking SW so that any port can output data to any desired port. In the present system, this is also simplified such that XC is realized by the selector which is a selection circuit for deciding whether to drop or put through signals input from high-speed transport lines, or whether to add lowspeed signals to high-speed transport lines or to put through. Coaxial selector may be used for the selector.

The limitation on the system imposed by this technique is that it is unable to allocate the lowspeed package carrying add/drop signals to any interface slots.

In the present embodiment, the method for monitoring a ring network as one subnetwork is also simplified. Conventionally, Q3 interface has been standardized on the basis of CMIP (common management information protocol) by presupposing a multi-vendor operating environment; however, detailed regulations are needed for e-messaging and data transport, and many heavy-duty functions are needed for implementation, so that there are many cases of unsatisfactory system performance, in reality. Recently, CORBA (common object request broker architecture) has served a base of further development, but there are many unclear points regarding the actual performance.

The simplest case is SNMP (simple network management protocol), which is the standard for IP networks, and in this embodiment, this method is adopted. However, TL1 or CORBA may also be used.

The present technique is able to monitor and control any router globally, but there are functional restrictions. One such restriction is that object generation and management cannot be performed, and another restriction is that alarms and reports cannot be issued on its own.

Regarding the inability to generate and manage objects, the problem is related particularly to connection generation. This is resolved by substituting a time slot 2.4 Gbit/s in the 40 Gbit/s operating speed for managing purposes. That is, a binary flag only is used to indicate whether the time slot is in use or not. Connection name and connection warning are not managed. Also, regarding self-issued alarm reports, network monitoring is replaced with fetching of information through periodic maintenance of subnetworks or external apparatuses. Alternatively, an application program may be used to periodically or automatically retrieve only the important information.

Embodiment 3

Figure 6:
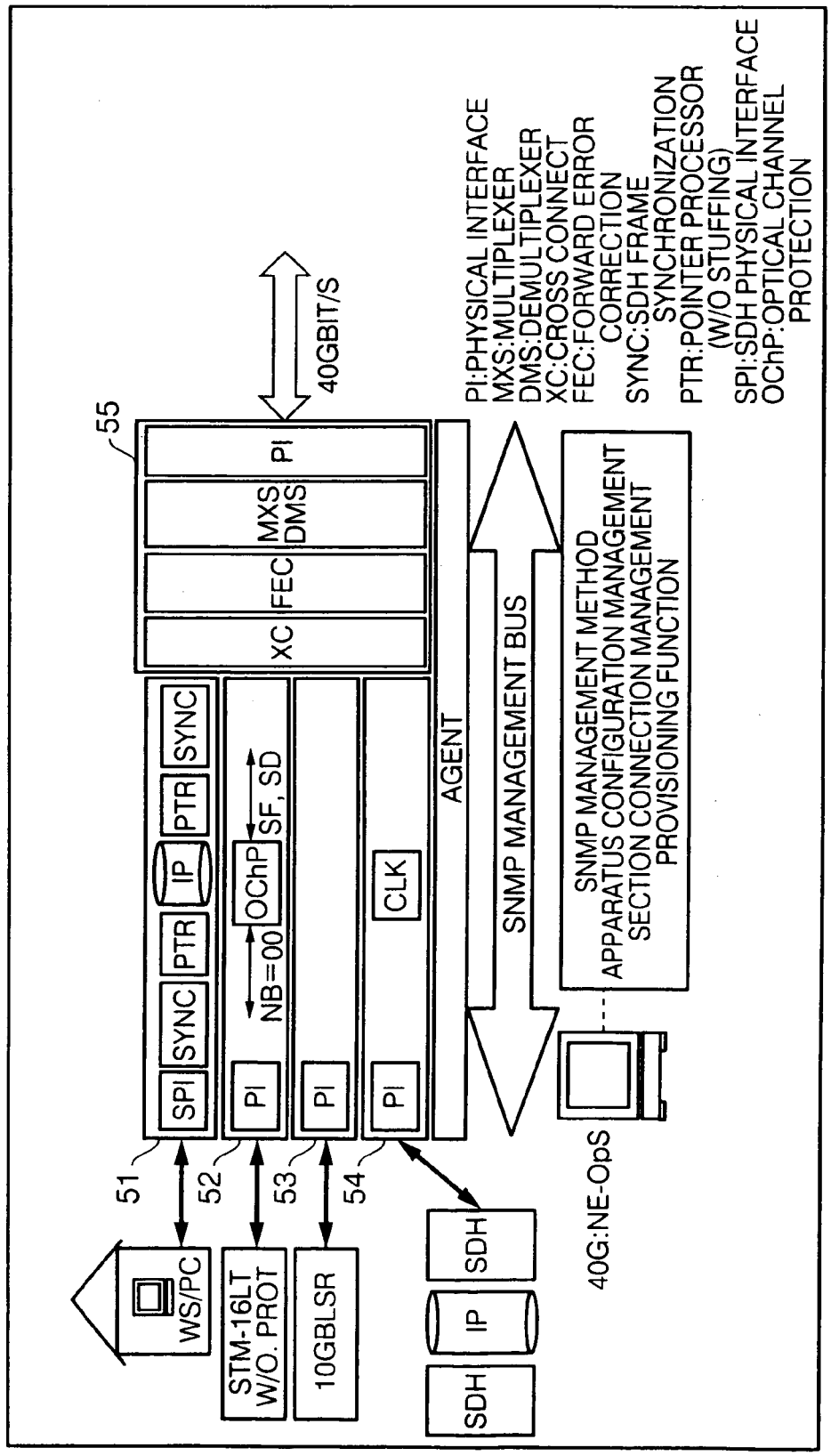
FIG. 6 is a block diagram of a transport system Embodiment 3 of the present transport system.
Figure 7:
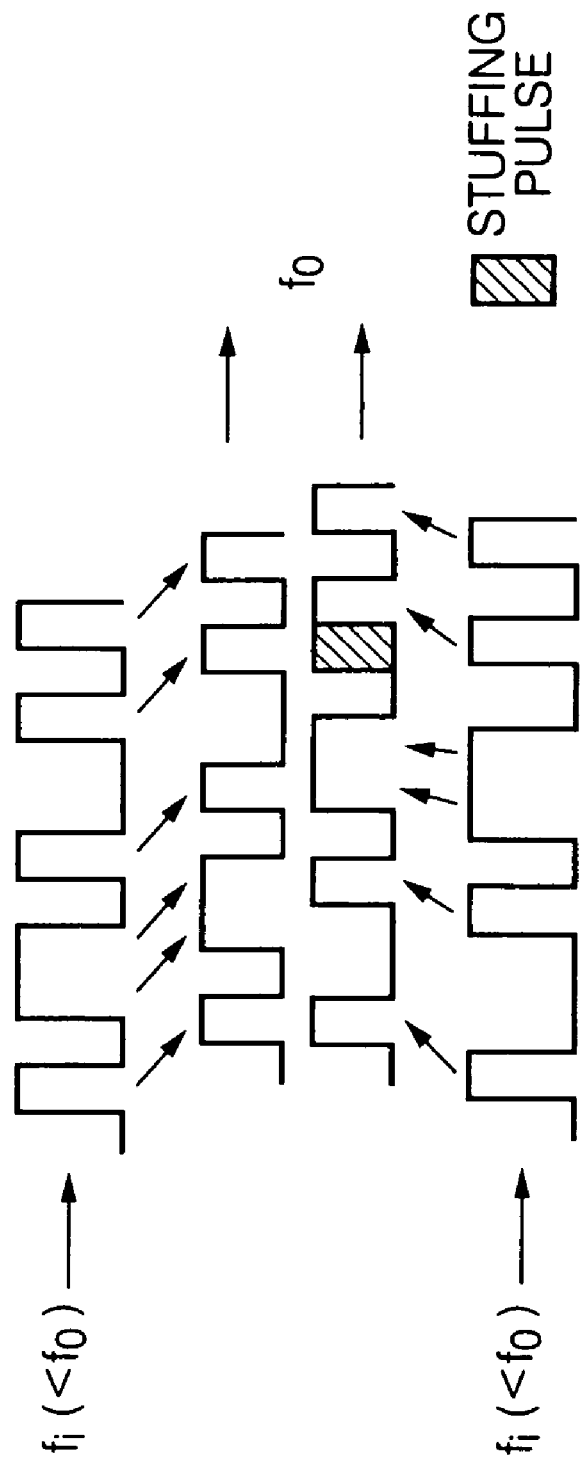
FIG. 7 is a diagram to explain the principle of stuff synchronization.
Figure 8:
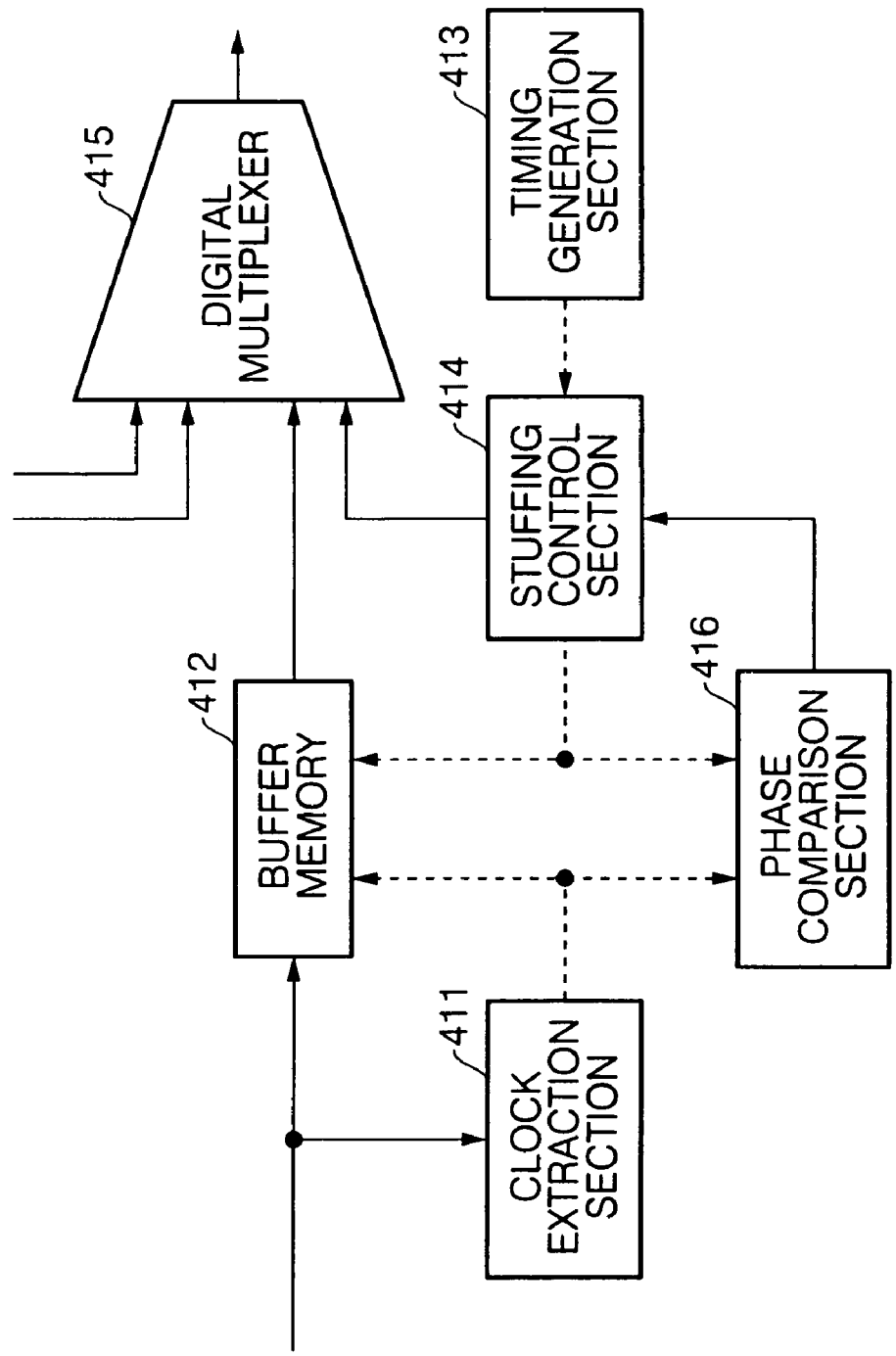
FIG. 8 is a block diagram of a stuff synchronized digital multiplexing apparatus.
Figure 9:
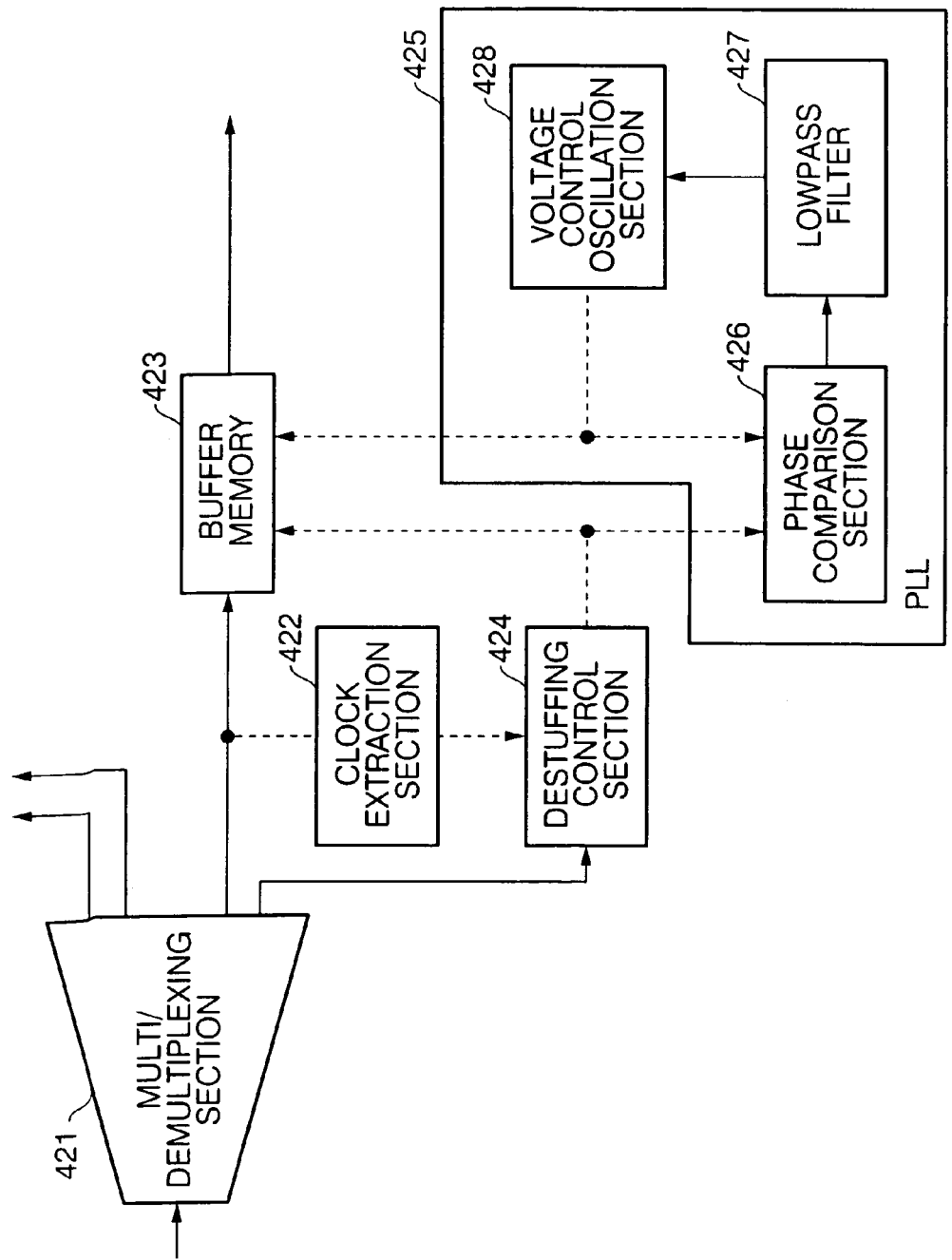
FIG. 9 is a block diagram of a stuff synchronized multi/demultiplexing apparatus.
Figure 10:
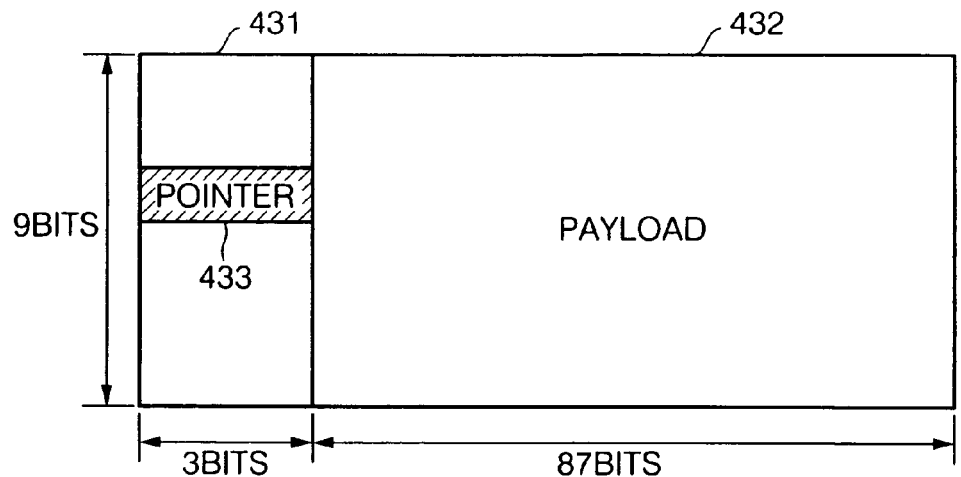
FIG. 10 is a diagram of an STM frame in the SDH architecture.
Figure 11:
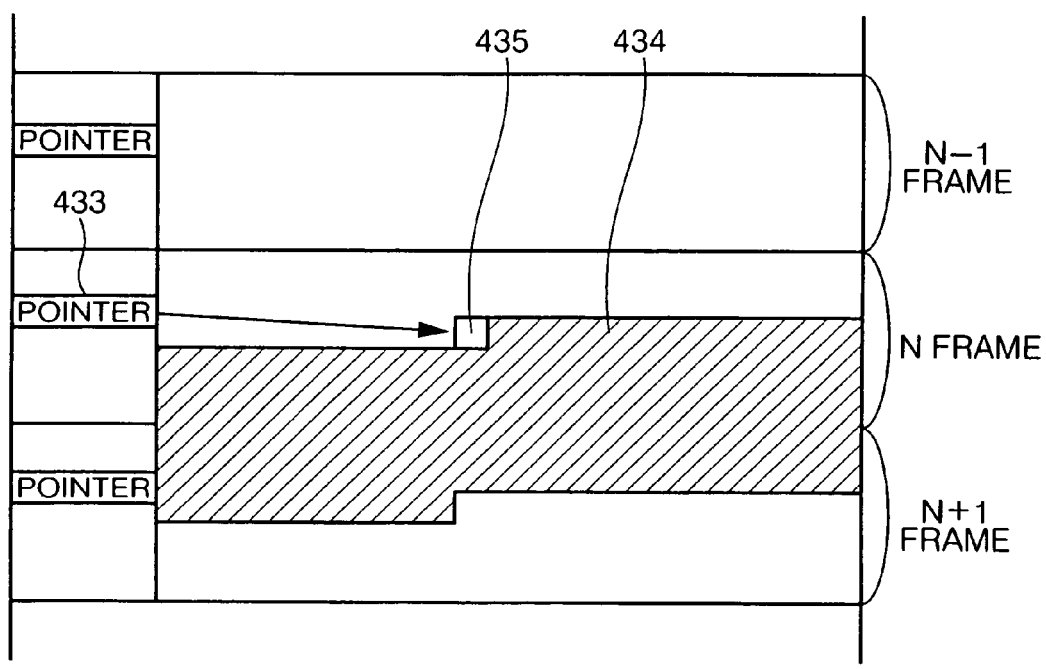
FIG. 11 is a diagram of a pointer.
Figure 12:
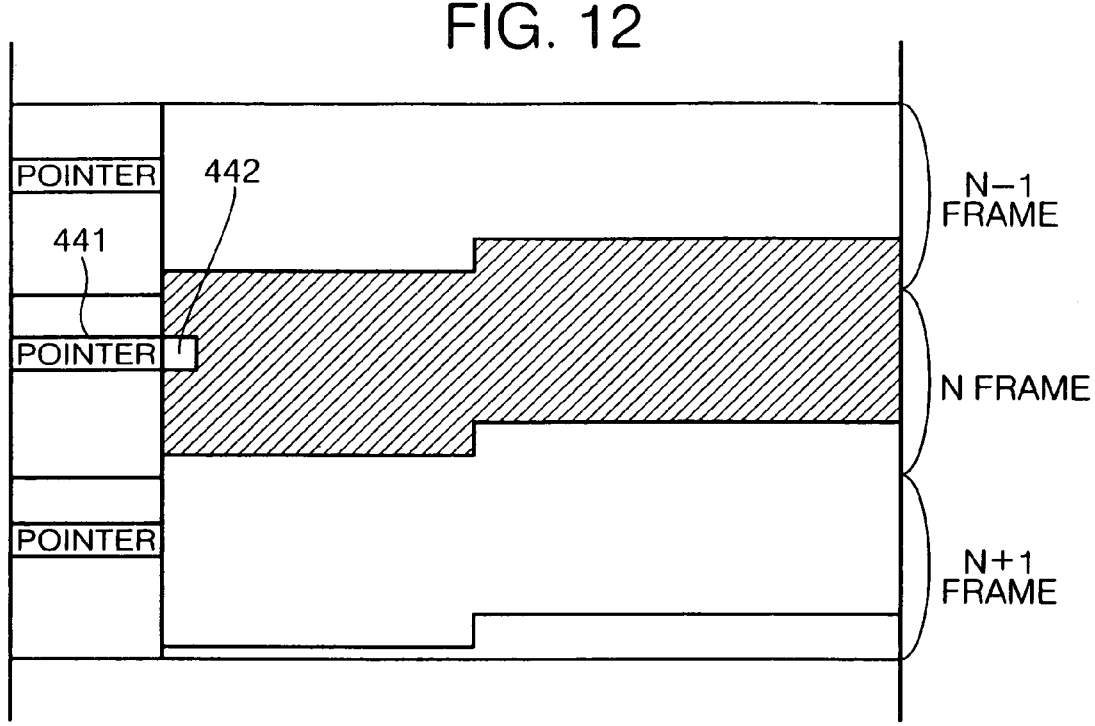
FIG. 12 is a diagram to explain positive stuff processing in an STM frame in the SDH architecture.
Figure 13:
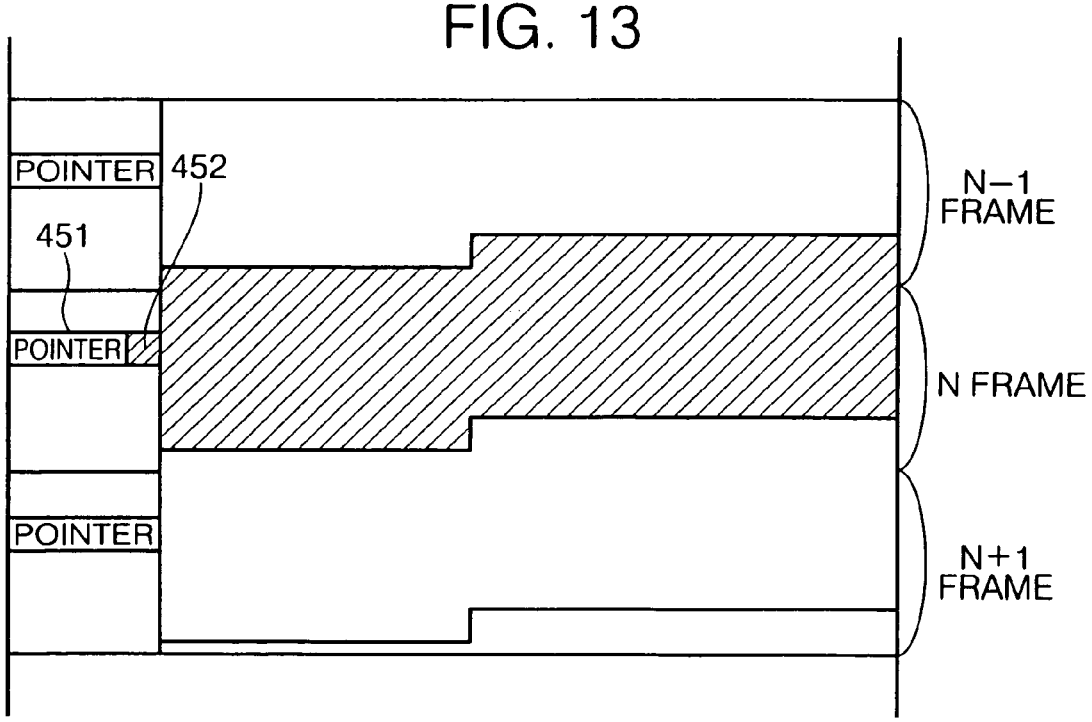
FIG. 13 is a diagram to explain negative stuff processing in an STM frame in the SDH architecture.

FIG. 6 shows a transport system in Embodiment 3, a TDM apparatus disposed at the entry/exit points of a ring structure WDM-NW in particular a TDM transport system having option functions. These option functions can be also used in point-to-point configuration.

In the systems presented in Embodiments 1, 2, breakdown in transport path is protected by the client's protection device. That is, in a DPT ring network, IPS (intelligent protection switching) is used and in OC-192, BLSR is used to restore a failure.

However, there is global proliferation of LT devices not having switching function, but it must be anticipated that some clients will demand that switching be provided by the WDM-NW. For this reason, in the present embodiment, protection function is provided internally in a part of interface card (IF) in parts of lowspeed tributary paths, so that this function is offered as an option to those clients demanding WDM-NW to provide a form of restoration by offering the IF to those clients only.

In FIG. 6, numerals 51, 52, 53, 54 refer to lowspeed IFs, 55 to a terminal processing section for TDM and additional OH add/drop circuits.

The lowspeed IF 51 corresponding to WS is comprised by: an SDH physical interface SPI; an SDH frame synchronization circuit SYNC; a SONET/SDH processing section PTR served by a pointer processor (w/o stuffing); and an IP routing section. Also, the lowspeed IF 52 corresponding to STM-16LT is comprised by: PI (physical interface) and optical channel protection OchP circuit, and the lowspeed IF 53 corresponding to BLSR is comprised only of PI, and lowspeed IF 54 corresponding to IP/SDH is comprised by PI and CLK-adjuster section. TDM and additional OH add/drop processing section 55 are comprised by: a cross connect XC; a FEC function (error correction code add/detect function); a TDM-MUX/DMX circuit (time division multi/demultiplexing); and a PI. It should be noted that XC is not included in those systems corresponding to 40 GTS in Embodiment 1.

If a failure occurs in a high-speed transport path, the apparatus detects LOS (loss of signal) or AIS (alarm indication signal), and so reports to the OchP in the lowspeed IF. The OchP sends an SF (signal failure) using the additional overhead OH to the OchP in the lowspeed IF in the opposing TDM transport apparatus within the WDM network. The OchP in the lowspeed IF of the opposing apparatus receiving the SF executes a path switch, and sends RR (reverse request) to the SF originator. The OchP receiving the RR switches path within the own station to complete the path protection process. The above process may be performed by using the same protocol as the APS (automatic protection switching) of SDH network described in the ITU-T G.841 (refer to ITU-T recommendation G.841r types and characteristics of SDH network protection architectures, 1995). In this case, 1+1 APS sequence or N:1 APS sequence may be used. The differences are that switching sequence to high-speed path is provided inside the lowspeed IF, and options are available for each lowspeed IF; in case of 1+1 APS, lowspeed signals are duplicated to high-speed path (for 1:N APS, necessary paths are reserved).

In the present embodiment, further optional function is included.

That is, in FIG. 6, client terminal WS is housed directly in the lowspeed IF 51, this is because the SONET/SDH processing section PTR and IP routing processing section IP are included in the IF 51, having many lowspeed ports, which houses a router function and performs IP routing. Here, routing may be made to another port of IF in own station, or to a port in the lowspeed IF (having routing function) in the opposing apparatus across the high-speed path.

Embodiment 4

Figure 14:
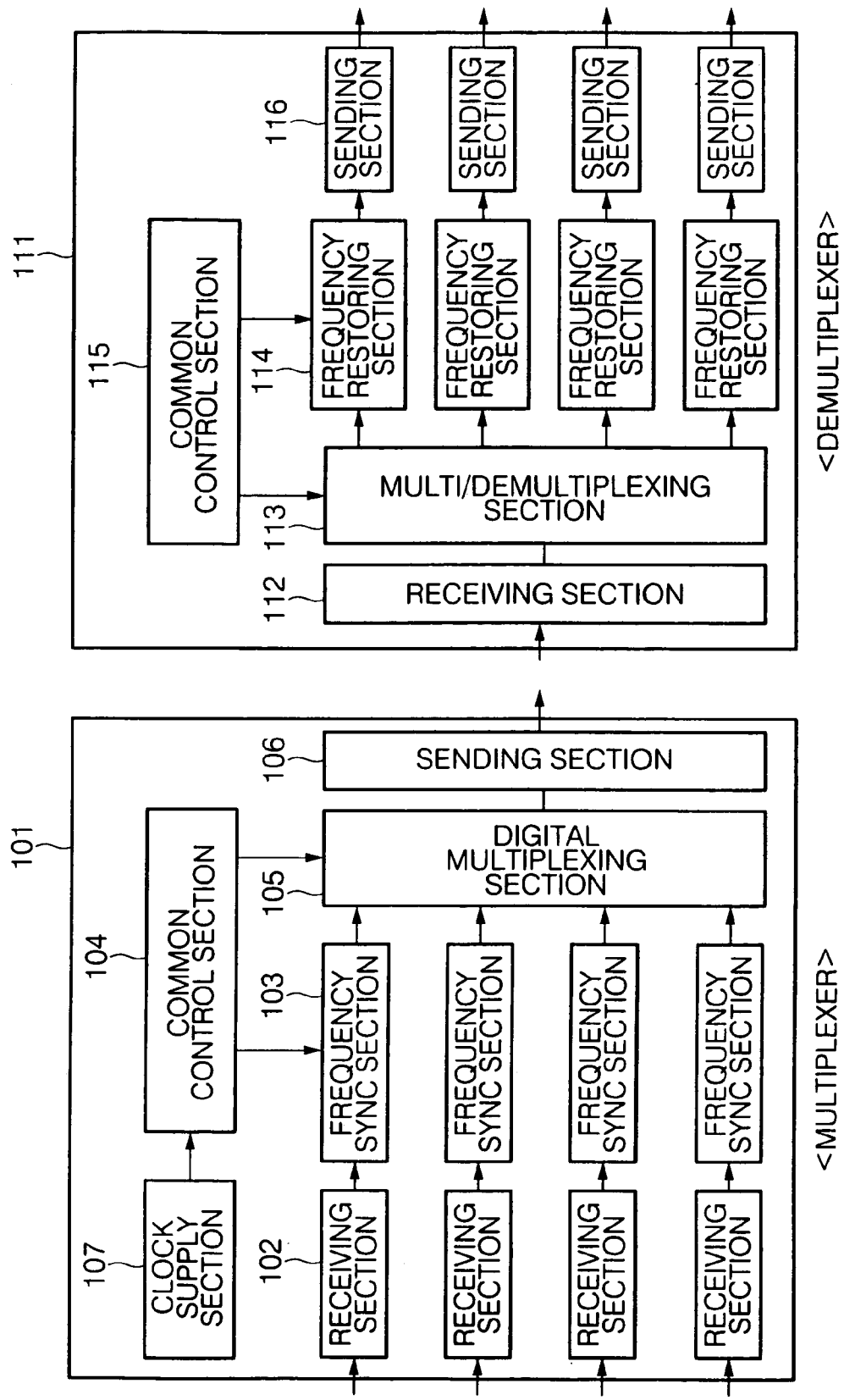
FIG. 14 is a block diagram of a transport system in Embodiment 4 of the present transport system.

FIG. 14 shows a block diagram of a transport system in Embodiment 4. A multiplexer 101 is comprised by: a receiving section 102 for receiving optical signals; a frequency sync section 103; a common control section 104; a digital multiplexing section 105; a sending section 106 for sending optical signals; and a clock section 107.

The receiving section 102 performs optical-electrical conversion of lowspeed signals which are input in the frequency sync section 103. The frequency sync section 103 detects phase difference between the signal clock extracted from the lowspeed digital signals and network clock synchronized to the oscillator, and when the difference exceeds a given positive stuffing threshold, positive stuffing is performed, and when the difference becomes lower than a given negative stuffing threshold, negative stuffing is performed. Overhead OH is comprised by a stuffing information transfer region and negative stuffing bits, and information regarding whether stuffing operation has or has not been performed is sent to a demultiplexer 111. Digital multiplexing section 105 multiplexes synchronized digital signals and OH, and subjects the multiplexed results and the lowspeed digital signals to TDM. The high-speed digital signals thus generated are converted to optical signals in the sending section 106, and are forwarded to the transport paths.

The demultiplexer 111 is comprised by: a receiving section 112 for receiving the high-speed digital signals; a multi/demultiplexing section 113; a frequency restoring section 114; a common control section 115; and a sending section 116 for sending the restored lowspeed digital signals.

The receiving section 112 performs optical-electrical conversion of high-speed digital signals and inputs converted signals in the digital demultiplexing section 113. The digital demultiplexing section 113 demultiplexes high-speed digital signals into a plurality of lowspeed digital signals, and inputs them in the frequency restoring section 114. The frequency restoring section 114 references the stuffing information transfer region, and if positive stuffing had been applied, stuffed bits are removed, and if negative stuffing had been applied, data are read from the negative stuffing bits, to restore lowspeed digital signals. The sending section 116 forwards the restored lowspeed digital signals to the lowspeed transfer device.

When destuffing is performed to delete stuffing bits, phase variation is always produced in the restored clock, i.e., destuffing jitters (waiting time jitters). However, when the lowspeed signals are synchronized digital signals and the restored clock frequency matches the frequency of the network synchronization clock, phase difference always remains within a range defined by the positive stuffing threshold and the negative stuffing threshold, so that positive/negative stuffing is not executed. Therefore, synchronization quality degradation due to positive/negative stuffing is not produced in synchronized digital signals so that synchronized digital signals and non-synchronized digital signals can be multiplexed.

The transport system may be designed so as to perform frequency synchronization by applying positive stuffing to all the lowspeed digital signals. In such a case, stuffing is performed even on synchronized signals, and quality degradation can be caused by destuffing. However, positive stuffing circuit is simpler than positive/negative stuffing circuit, so that the cost of frequency synchronization function to be provided to the lowspeed signal interface can be minimized. Such a system also enables to avoid technical problems associated with generating a high-speed clock synchronized to the network. Also, clock frequency of multiplexed signals can be freely chosen, so that destuff jitters can be suppressed by increasing the proportion of inserted stuffing pulses and using a phase locked loop in the demultiplexer.

Embodiment 5

Figure 15:
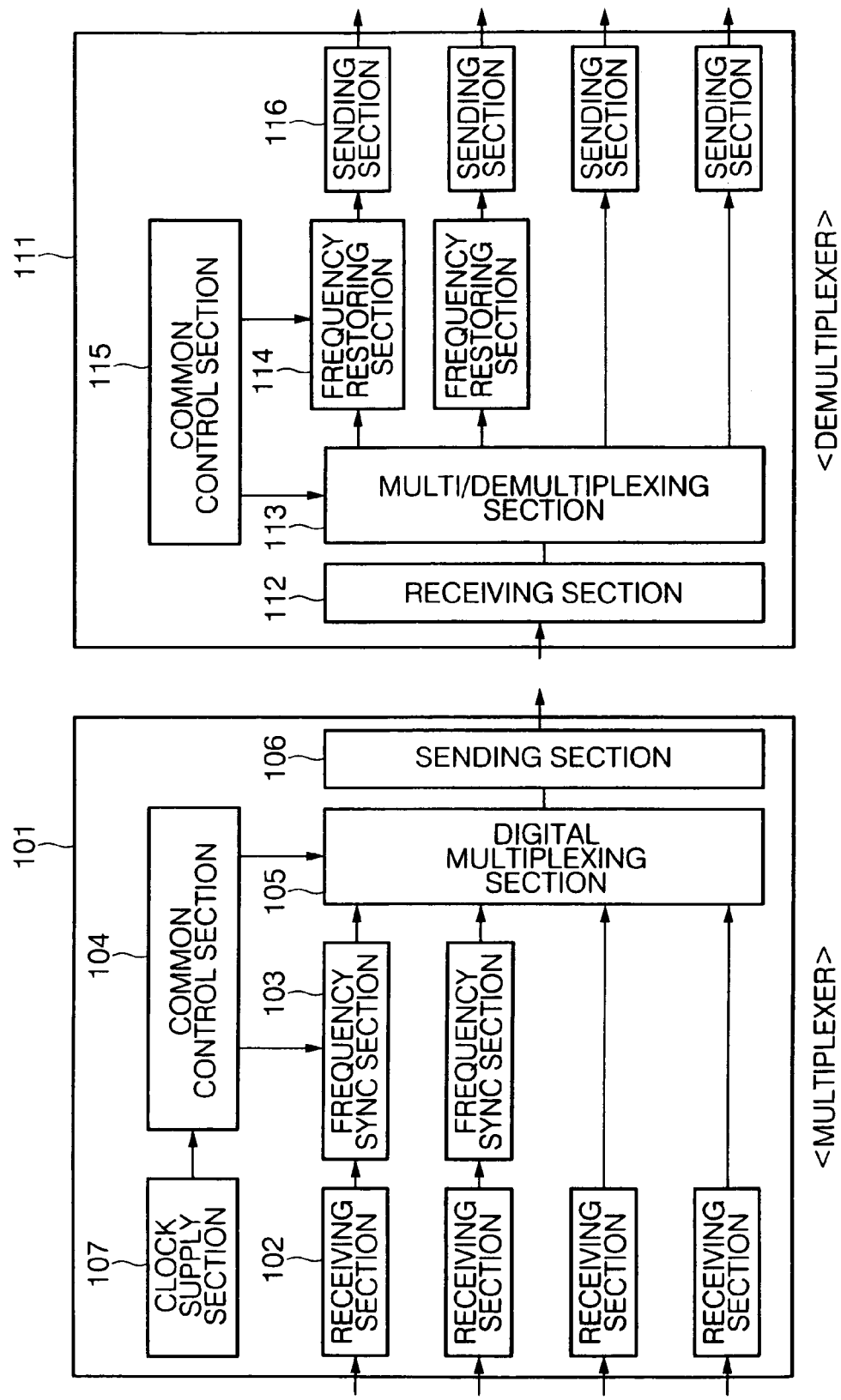
FIG. 15 is a block diagram of a transport system Embodiment 5 of the present transport system.

FIG. 15 shows a block diagram of a transport system in Embodiment 5. In this embodiment, only the interface for non-synchronized digital signals is provided with the frequency synchronization function according to positive/negative stuffing. By eliminating the frequency synchronization function for non-synchronized digital signals, the cost of the apparatus can be lowered.

Figure 16:
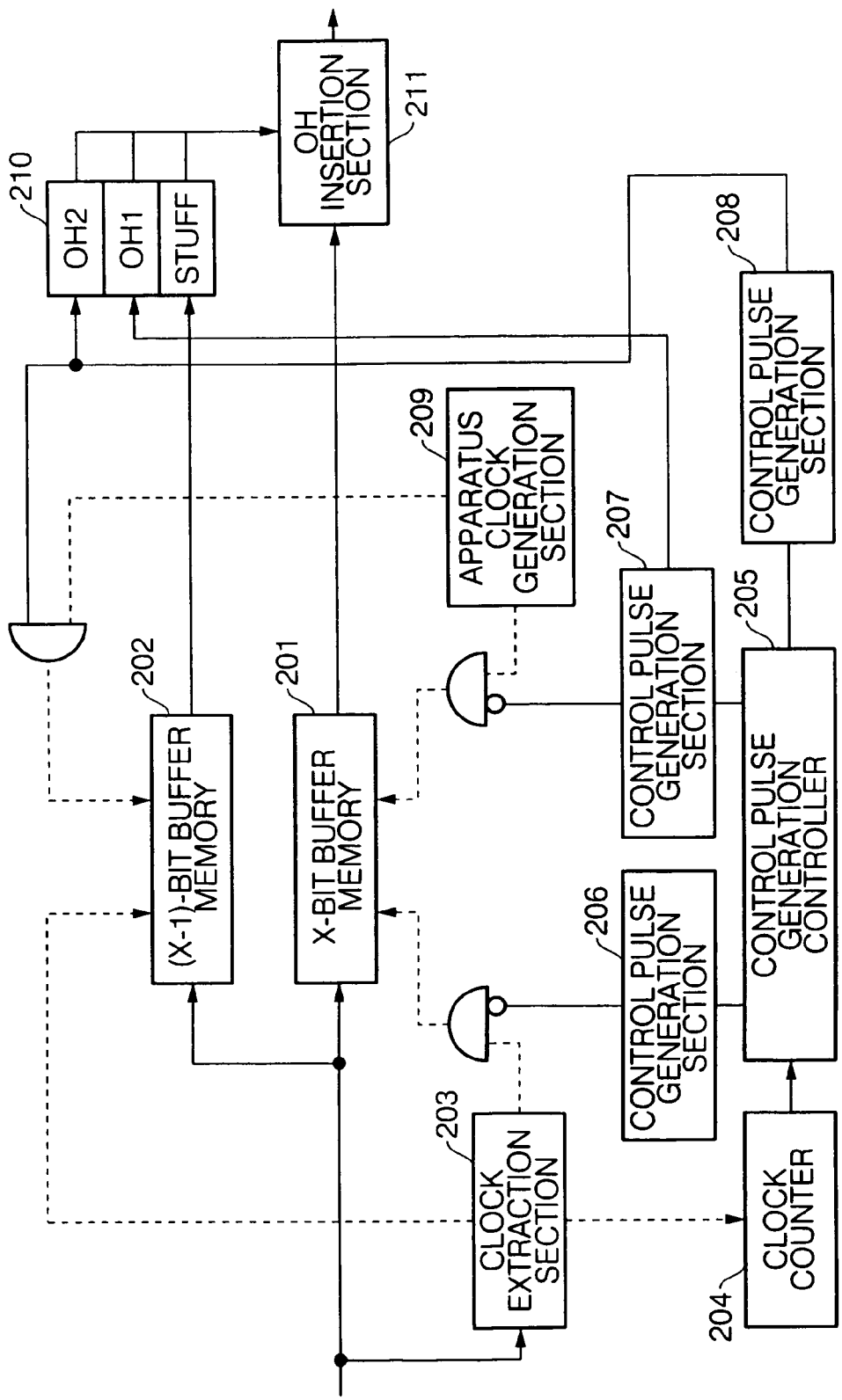
FIG. 16 is a block diagram of the configuration of the frequency sync section of the multiplexer in the present packet transport system.

FIG. 16 shows a block diagram of the frequency sync section 103 in the multiplexer 101. Lowspeed digital input signals are accumulated in both x-bit buffer memory 201 (where x is an integer) and (x−1)-bit buffer memory 202, and simultaneously, clock signals are extracted from the lowspeed digital signals input in the clock extraction section 203, and counted in the clock counter 204. Results of counting are transferred to the control pulse generation controller 205, and are compared with the clock count of the apparatus clock generation section 209, and the control pulse generation section 206, 207, and 208 are operated according to the comparison results.

When the clock count extracted from the input signals matches the clock count of the apparatus clock generation section 209, data are successively output from the x-bit buffer memory 201, but no data are output from the (x−1)-bit buffer memory 202. Information indicating that stuffing using the additional overhead (additional OH) 210 will not be performed is sent to an overhead insertion section 211 for stuffing information transfer purposes.

When the clock count extracted from the input signals is lower than the clock count of the apparatus clock generation section 209, read operation from the x-bit buffer memory 201 is temporarily stopped, and read operation from (x−1)-bit buffer memory 202 is also not performed. Information that positive stuffing has been performed by the additional overhead 210 is sent to the overhead insertion section 211.

When the clock count extracted from the input signals is higher than the clock count of the apparatus clock generation section 209, write operation to the x-bit buffer memory 201 is temporarily stopped, and data are read from both the x-bit buffer memory 201 and the (x−1)-bit buffer memory 202. Information that data read from the (x−1)-bit and that negative stuffing has been performed by the additional overhead 210 is sent to the overhead insertion section 211.

By applying such stuffing operations, lowspeed digital input signals are synchronized and are input in the digital multiplexer 105. The digital multiplexer 105 subjects a plurality of synchronized digital signals to TDM to produce high-speed digital signals, which are output to transport paths.

Figure 17:
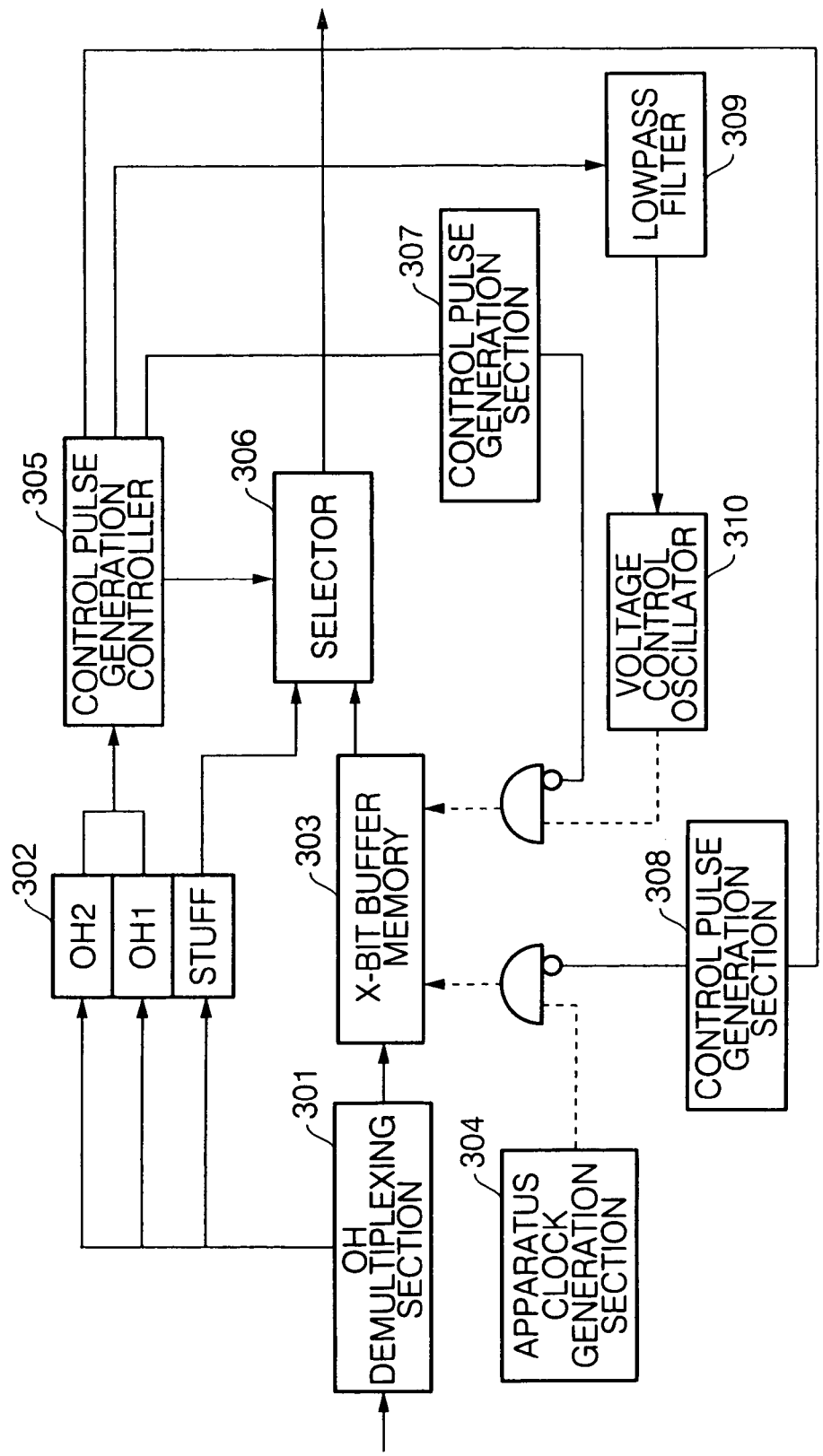
FIG. 17 is a block diagram of the configuration of the frequency restoring section of the demultiplexer in the present packet transport system.

FIG. 17 shows a block diagram of the construction of a frequency restoring section 114 in the demultiplexing apparatus 111 in the present transport system. The clock generation section 304 generates apparatus clock according to the clock extracted from the synchronized digital signals input from the demultiplexer 113. Using this apparatus clock, the overhead demultiplexing section 301 reads stuffing transfer information OH and negative staffing OH 302 from the synchronized digital signals so that the control pulse generation controller 305 determines whether or not stuffing had been applied. Synchronized digital signals are input in the x-bit buffer memory 303.

If stuffing has not been applied, data are read successively from the x-bit buffer memory 303 at the synchronized frequency of the apparatus clock matching the voltage control oscillator 310. If positive stuffing had been applied, the control pulse generation controller 305 controls voltage control oscillator 310 so as to average out positive stuffing steps over a long period and adjusts the read-clock, and write-clocks of the x-bit buffer memory 303 are deleted at the stuffing pulse insertion locations. In other words, the data are destuffed. If negative stuffing had been applied, the control pulse generation controller 305 controls voltage control oscillator 310 so as to average out negative stuffing steps over a long period and delays the read-clock by 1-bit, and data are read from the negative stuffing OH by the selector 306. Accordingly, lowspeed digital signals of original frequency are restored.

Embodiment 6

Figure 18:
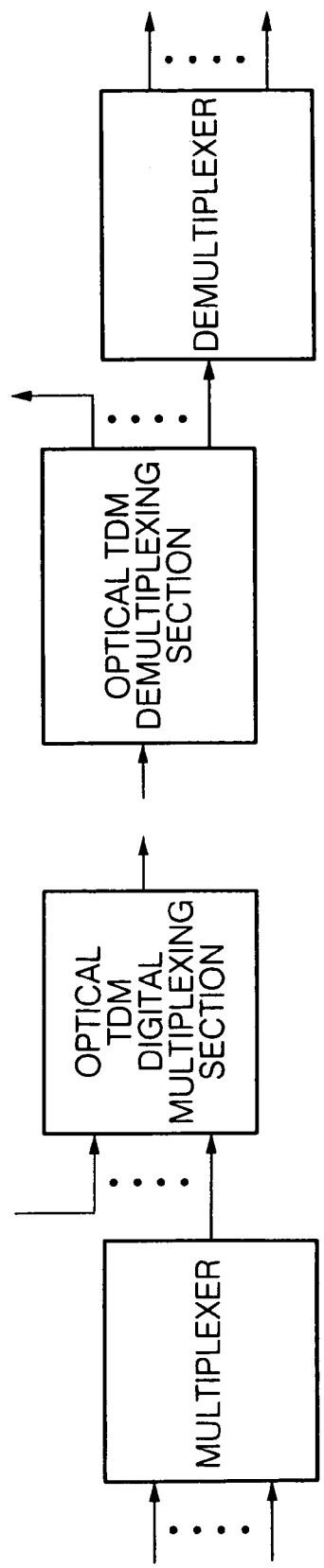
FIG. 18 is a block diagram of a transport system Embodiment 6 of the present transport system.

FIG. 18 shows an illustration to explain a transport system in Embodiment 6. FIG. 18 shows a transport system in which multiplexed signals produced by the multiplexing apparatus (in FIGS. 14, 15 as 101, and in FIG. 16) in the present transport system are subjected to optical time division multiplexing for optical signal transmission. Such a system enables to transport signals at ultra-high-speed exceeding the limitations imposed by electrical transport circuits.

Embodiment 7

Figure 19:
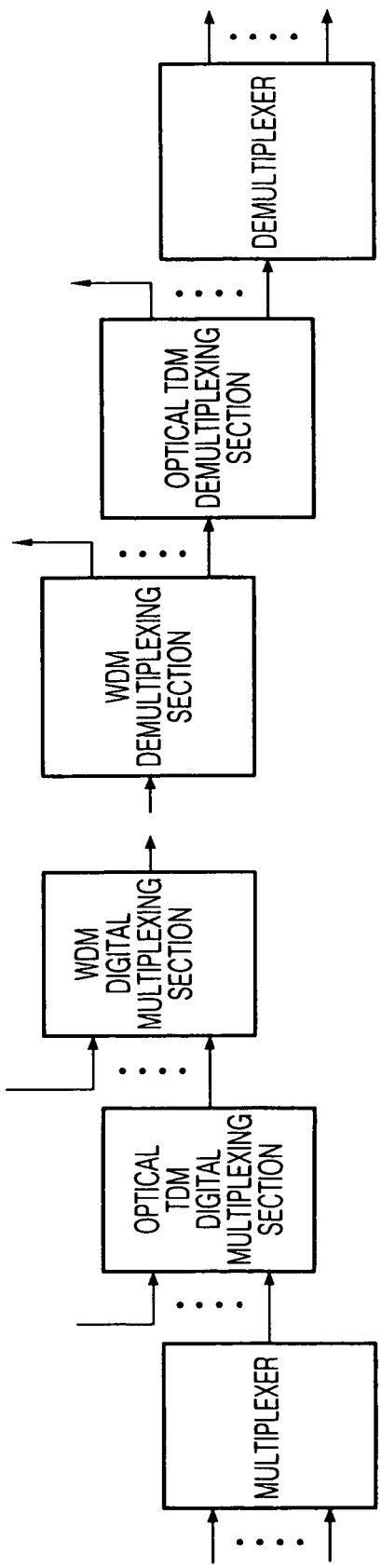
FIG. 19 is a block diagram of a transport system Embodiment 7 of the present transport system.

FIG. 19 shows a transport system in Embodiment 7. FIG. 19 shows a transport system in which the multiplexed signals produce by the multiplexing apparatus in the present transport system are subjected to optical time division multiplexing, and the resulting multiplexed signals are further subjected to wavelength division multiplexing for optical signal transmission. By using both optical TDM and WDM, the transport capacity per one transport path can be expanded significantly.

In the embodiments described above, representative advantages accrued from the present invention will be summarized briefly below.

(1) The present invention enables to reduce the cost of data transport by multiplexing signals from several different clients while providing a transparent and high quality service to the clients. In particular, "high quality" means that bit slip is eliminated and failure in transport path is automatically safeguarded. Frequency adjusting function and switching function are provided as options to respond to individual needs of clients, thereby enabling to flexibly accommodate clients having different quality requirements.

(2) The present invention enables network carriers to process synchronized and non-synchronized digital signals without using the pointer function of SDH architecture at stable line quality, so that the entire frame of any SDH network can be handled as user signals. By so doing, users can utilize SDH overhead for monitoring own networks. Also, high-speed routers using interface cards that do not have the pointer function can be accommodated directly in the carrier networks.

What is claimed is:
1. A transport system comprising:
time division multiplexing means for applying time division multiplexing of a whole signal of a client including client overhead transparently;
attaching means for attaching an additional overhead to said whole signal of said client; and
wavelength division multiplexing transporting means for transporting a time-division-multiplexed signal represented by one wavelength containing said additional overhead from one network to another network by applying wavelength division multiplexing,
wherein said additional overhead contains bits defining frame synchronization or channel selection, and an insertion cycle of said bits is shorter than a frame cycle of client signals,
wherein said additional overhead contains bits defining error correction, and said system performs error correction,
wherein said additional overhead contains bits defining data storage for applying negative stuffing to adjust a frequency of a client clock, and positive stuffing is applied by inserting said bits in a payload,
wherein said additional overhead contains bits defining stuffing information, and
wherein said time division multiplexing is based on bit interleaving or byte interleaving.

2. A transport system according to claim 1, wherein said transport system is an optical transport system.

3. A transport system according to claim 1, wherein quality degradation of the signal or failure detection is performed by an error correction bit counter.

4. A transport system according to claim 1, wherein said system contains option means for enabling each client to select automatic restore function for line failure.

5. A transport system according to claim 1, wherein said system directly accommodates a LAN interface from a client terminal and has a routing function for routing between lowspeed interfaces or to a lowspeed interface of an opposing apparatus.

6. A transport system according to claim 5, wherein said time division multiplexing is performed after mapping lowspeed signals received from a client terminal to respective high-speed channels.

7. A transport system according to claim 1, wherein control of monitoring of input/output operations of lowspeed client signal is performed by analogue means.

8. A transport system according to claim 1, wherein said system is a ring type network.

9. A transport system according to claim 8, wherein a cross connecting switch for selecting signal paths is comprised by a selector.

10. A transport system according to claim 8, wherein sub-network monitoring for one ring network is based on a simple network management protocol, known as SNMP.

11. A transport system according to claim 1, wherein, for multiplexing synchronized and non-synchronized signals, said system is provided with a synchronizing section for attaching said additional overhead to a digital signal for use in positive and negative stuffing and synchronizing the digital signal to a frequency of a network synchronizing clock to generate a synchronized digital signal; and a time division multiplexing section for time division multiplexing of the synchronized digital signal.

12. A transport system according to claim 11 comprising:
a multiplexer comprised by a clock supply section for supplying network synchronizing clock signals;

a receiving section for optical-electrical conversion of a lowspeed optical signal to regenerate a lowspeed digital signal;

a frequency synchronizing section for attaching an additional overhead to the lowspeed digital signal, applying positive or negative stuffing with reference to the additional overhead, and synchronizing an original frequency of the lowspeed digital signal to a synchronizing frequency of said own network;

a digital multiplexing section for time division multiplexing a plurality of synchronized lowspeed digital signals;

a common control section for controlling the frequency synchronizing section and the digital multiplexing section; and a sending section for converting time division multiplexed signal to a high-speed optical signal and forwarding to a communication path; and also a demultiplexer comprised by:

a multi/demultiplexing section for optical-electrical conversion of a high-speed optical signal to regenerate the high-speed digital signal;

a frequency restoring section for restoring the synchronized lowspeed signal to said original frequency of the lowspeed signal by applying positive or negative stuffing with reference to the additional overhead attached to the lowspeed digital signal;

a common controller for controlling the multildemultiplexing section and the frequency restoring section; and a sending section for converting the restored lowspeed digital signal to an optical signal and forwarding to a lowspeed transport apparatus.

13. A transport system according to claim 12, wherein said frequency synchronizing section is provided only in a channel receiving the non-synchronized lowspeed digital signal in the multiplexer and said frequency restoring section is provided only in a channel outputting the non-synchronized lowspeed digital signal in the demultiplexer.

14. A transport system according to one of claim 12, wherein said frequency sync section is comprised by: a clock counter; an x-bit buffer memory; an (x–1)-bit buffer memory; control pulse generation sections; a control pulse generation controller; a negative stuffing overhead insertion section; a staff information transport overhead insertion section; a clock extraction section for extracting clock signals from input data including a synchronized digital signal or a non-synchronized digital; and an apparatus clock generation section.

15. A transport system according to one of claim 13, wherein said frequency sync section is comprised by: a clock counter; an x-bit buffer memory; an (x–1)-bit buffer memory; control pulse generation sections; a control pulse generation controller; a negative stuffing overhead insertion section; a staff information transport overhead insertion section; a clock extraction section for extracting clock signals from input data including a synchronized digital signal or a non-synchronized digital; and an apparatus clock generation section.

16. A transport system according to claim 14, wherein said x-bit buffer memory and said (x–1)-bit buffer memory accumulate input data; said clock extraction section extracts clock signal of the input data signal; said clock counter counts extracted clock signals and forwards a count result to said control pulse generation controller, which operates said control pulse generation sections by comparing a clock count decided by said apparatus clock generation section with the clock count in said control pulse generation controller.

17. A transport system according to claim 14, wherein, when a clock count matches a regulation count, bits are successively read from the x-bit buffer memory and not read from the (x–1)-bit buffer memory, and so reported to the stuffing information transfer overhead insertion section; and when a clock count is lower than the regulation count, reading of bits from the x-bit buffer memory is stopped and bits are not read from the (x–1)-bit buffer memory, and so reported to the stuffing information transfer overhead insertion section; and when a clock count is higher than the regulation count, writing the x-bit buffer memory is temporarily, stopped and bits are read from both the x-bit buffer memory and the (x–1)-bit buffer memory, and information read from the (x–1)-bit buffer memory is transferred to the negative stuff overhead insertion section; and so reported to the stuffing information transfer overhead insertion section.

18. A transport system according to claim 12, wherein said frequency restoring section is comprised by: an apparatus clock generation section for extracting a client clock from a transport path and converting the client clock to an apparatus clock; a x-bit buffer memory; a control pulse generation section; a control pulse generation controller; a negative stuff overhead read circuit, a staff information transfer overhead read circuit; a selector circuit for selecting an output from the negative stuff overhead read circuit or an output from the x-bit buffer memory; and a voltage control oscillator.

19. A transport system according to claim 18, wherein high-speed data are written to said x-bit buffer memory and simultaneously, stuffing information transfer overhead information is read by the stuffing information transfer overhead read circuit, and the stuffing information transfer overhead information thus read is transferred to the control pulse generation controller.

20. A transport system according to claim 18, wherein
if stuffing is not required,
said voltage control oscillator reads bits successively from the x-bit buffer memory at a frequency synchronized to the apparatus clock frequency; and
if positive stuffing is to be applied several times,
said control pulse generation controller averages positive stuffing over a prolonged application interval so as to control read-clock by controlling said voltage control oscillator; and
if negative stuffing is to be applied several times;
said control pulse generation controller averages negative stuffing over a prolonged application interval so as to control read-clock by controlling said voltage control oscillator and simultaneously, reads information from the negative stuffing information overhead read circuit, and said selector circuit switches from the x-bit buffer memory to the negative stuff overhead read circuit so as to generate a continuous data.

21. A transport system according to claim 1, wherein said system includes: a synchronization section for inserting an additional overhead to a digital signal, and applying positive stuffing according to said additional overhead so as to synchronize client frequency to an apparatus frequency; a time division multiplexing section for time division multiplexing the synchronized digital signal; and a multi/demultiplexing section for demultiplexing time division multiplexed synchronizes signal so as to restore an original digital signal.

22. A transport system according to claim 12, wherein multiplexed signals are further subjected to optical time division multiplexing.

23. A transport system according to claim 13, wherein multiplexed signals are further subjected to optical time division multiplexing.

24. A transport system according to claim 21, wherein multiplexed signals are further subjected to optical time division multiplexing.

25. A transport system according to claim 22, wherein multiplexed signals are further subjected to wavelength division multiplexing.

26. A transport system according to claim 23, wherein multiplexed signals are further subjected to wavelength division multiplexing.

27. A transport system according to claim 24, wherein multiplexed signals are further subjected to wavelength division multiplexing.

28. A method for wavelength division multiplexing by first applying time division multiplexing transparently to whole signal of a client and attaching an additional overhead to the whole signal and representing the whole signal having the additional overhead by one wavelength and transporting a wavelength division multiplexed signal through a network, wherein said additional overhead contains bits defining frame synchronization or channel selection, and an insertion cycle of said bits is shorter than a frame cycle of client signals, wherein said additional overhead contains bits defining error correction, and said system performs error correction, wherein said additional overhead contains bits defining data storage for applying negative stuffing to adjust a frequency of a client clock, and positive stuffing is applied by inserting said bits in a payload, wherein said additional overhead contains bits defining stuffing information, and wherein said time division multiplexing is based on bit interleaving or byte interleaving.

29. A method according to claim 28, wherein, for multiplexing synchronized and nonsynchronized signals, said method comprises additional step of adding an additional overhead to a digital signal, applying positive or negative stuffing according to overhead information, synchronizing a client frequency to a network frequency, and applying time division multiplexing for transport of a digital signal to be demultiplexed by a receiving equipment to regenerate an original digital signal.

30. A method according to claim 28, wherein, for multiplexing synchronized and nonsynchronized signals, said method comprises additional step of adding an additional overhead to a digital signal, applying positive stuffing according to overhead information, synchronizing frequencies, and applying time division multiplexing for transport of a digital signal to be demultiplexed by a receiving equipment to regenerate an original digital signal.

* * * * *